(12) United States Patent
Kazi et al.

(10) Patent No.: US 10,270,882 B2
(45) Date of Patent: Apr. 23, 2019

(54) MENTIONS-MODULES ON ONLINE SOCIAL NETWORKS

(71) Applicant: Facebook, Inc., Menlo Park, CA (US)

(72) Inventors: Rousseau Newaz Kazi, San Francisco, CA (US); Mark Andrew Rich, Redwood City, CA (US); Christina Joan Sauper, San Francisco, CA (US); Amaç Herdağdelen, Mountain View, CA (US); Soorya Vamsi Mohan Tanikella, Redmond, WA (US); Brett Matthew Westervelt, Menlo Park, CA (US); Maykel Andreas Louisa Jozef Anna Loomans, San Francisco, CA (US); Adam Eugene Bussing, San Francisco, CA (US); Shuyi Zheng, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 559 days.

(21) Appl. No.: 15/014,911

(22) Filed: Feb. 3, 2016

(65) Prior Publication Data
US 2017/0220579 A1   Aug. 3, 2017

(51) Int. Cl.
| | | |
|---|---|---|
| G06F 7/00 | (2006.01) | |
| G06F 17/30 | (2006.01) | |
| H04L 29/08 | (2006.01) | |
| G06F 17/27 | (2006.01) | |
| H04L 12/58 | (2006.01) | |

(52) U.S. Cl.
CPC ........ *H04L 67/306* (2013.01); *G06F 17/277* (2013.01); *G06F 17/30867* (2013.01); *H04L 51/18* (2013.01); *H04L 51/32* (2013.01); *H04L 67/20* (2013.01)

(58) Field of Classification Search
CPC ............ G06F 17/3053; G06F 17/2235; H04L 51/12; H04L 67/306
USPC ........................................................ 707/730
See application file for complete search history.

(56) References Cited

U.S. PATENT DOCUMENTS

| | | | |
|---|---|---|---|
| 5,918,014 A | 6/1999 | Robinson | |
| 6,539,232 B2 | 3/2003 | Hendrey | |
| 6,957,184 B2 | 10/2005 | Schmid | |
| 7,069,308 B2 | 6/2006 | Abrams | |
| 7,379,811 B2 | 5/2008 | Rasmussen | |

(Continued)

OTHER PUBLICATIONS

U.S. Appl. No. 15/014,846, filed Feb. 3, 2016, Kazi.
U.S. Appl. No. 15/014,868, filed Feb. 3, 2016, Kazi.
U.S. Appl. No. 15/014,895, filed Feb. 3, 2016, Kazi.

*Primary Examiner* — Binh V Ho
(74) *Attorney, Agent, or Firm* — Baker Botts L.L.P.

(57) ABSTRACT

In one embodiment, a method includes accessing a plurality of communications, each communication being associated with a particular content item and including a text of the communication; extracting, for each of the communications, n-grams from the text of the communication; identifying mention-terms from the extracted n-grams, each mention-term being a noun-phrase; calculating a term-score for each mention-term based on a frequency of occurrence of the mention-term in the communications; and generating a mentions-module including mentions, each mention including a mention-term having a term-score greater than a threshold term-score and text from communications comprising the mention-term.

20 Claims, 12 Drawing Sheets

(56) References Cited

U.S. PATENT DOCUMENTS

| | | |
|---|---|---|
| 7,539,697 B1 | 5/2009 | Akella |
| 7,752,326 B2 | 7/2010 | Smit |
| 7,783,630 B1 | 8/2010 | Chevalier |
| 7,836,044 B2 | 11/2010 | Kamvar |
| 8,027,990 B1 | 9/2011 | Mysen |
| 8,055,673 B2 | 11/2011 | Churchill |
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |
| 8,145,636 B1 | 3/2012 | Jeh |
| 8,180,804 B1 | 5/2012 | Narayanan |
| 8,185,558 B1 | 5/2012 | Narayanan |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2007/0174304 A1 | 7/2007 | Shrufi |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0248486 A1* | 10/2009 | Gupta ............ G06Q 30/02 705/14.64 |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0022602 A1 | 1/2011 | Luo |
| 2011/0078166 A1 | 3/2011 | Oliver |
| 2011/0087534 A1 | 4/2011 | Strebinger |
| 2011/0125759 A1* | 5/2011 | Querel ............ G06F 17/30899 707/748 |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0047147 A1 | 2/2012 | Redstone |
| 2012/0059708 A1 | 3/2012 | Galas |
| 2012/0131021 A1* | 5/2012 | Blair-Goldensohn ............ G06F 17/30719 707/750 |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |

(56) References Cited

U.S. PATENT DOCUMENTS

| | | | |
|---|---|---|---|
| 2013/0191372 A1 | 7/2013 | Lee | |
| 2013/0191416 A1* | 7/2013 | Lee | G06F 17/30979 |
| | | | 707/771 |
| 2013/0198219 A1 | 8/2013 | Cohen | |
| 2013/0204737 A1 | 8/2013 | Agarwal | |
| 2013/0226918 A1 | 8/2013 | Berkhim | |
| 2013/0227011 A1 | 8/2013 | Sharma | |
| 2013/0246404 A1 | 9/2013 | Annau | |
| 2013/0254305 A1 | 9/2013 | Cheng | |
| 2013/0297581 A1* | 11/2013 | Ghosh | G06F 17/30864 |
| | | | 707/706 |
| 2014/0006416 A1 | 1/2014 | Leslie | |
| 2014/0067535 A1 | 3/2014 | Rezaei | |
| 2014/0122465 A1 | 5/2014 | Bilinski | |
| 2014/0143225 A1* | 5/2014 | Lee | G06F 17/30274 |
| | | | 707/706 |
| 2014/0278365 A1* | 9/2014 | Zhang | G06F 17/2785 |
| | | | 704/9 |
| 2015/0058344 A1* | 2/2015 | Bhatia | G06F 17/30598 |
| | | | 707/737 |
| 2015/0106360 A1* | 4/2015 | Cao | G06F 17/30716 |
| | | | 707/723 |
| 2015/0222617 A1* | 8/2015 | Ebersman | H04L 51/12 |
| | | | 726/4 |
| 2016/0133256 A1* | 5/2016 | Lembersky | G10L 15/26 |
| | | | 704/235 |

\* cited by examiner

MENTIONS-MODULES ON ONLINE SOCIAL NETWORKS

TECHNICAL FIELD

This disclosure generally relates to online social networks, and in particular, to search queries and generating search-results on an online social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may receive a request from a client system (e.g., of a user of the online social network) associated with a particular content item. A content item may be defined to include a link to an article, a link to a media item, an embedded content object containing a media item, or any other suitable reference to particular content. The social-networking system may identify communications associated with the particular content item. The identified communications may be authored by users of the online social network, or by any other entity. The communications may include posts, reshares, comments, messages, or other suitable communications. The social-networking system 160 may generate search-results modules relating to the particular content item. Each of the search-results modules may be of a particular module type. A search-results module may include information from a subset of the identified communications associated with the particular content item. The information included in the search-results module may correspond to the particular module type of the search-results module. As an example and not by way of limitation, a search-results module that may be of a sentiments-module type may include information about the sentiments associated with a subset of the identified communications. The social-networking system may generate a particular search-results module if there exists a number of communications in the subset of identified communications associated with the particular content item greater than a module-specific threshold number of communications. The social-networking system may send to the client system a customized search-results interface for the particular content item that includes one or more of the generated search-results modules. A user of the client system may use these search-results interfaces (so-called "pulse pages") and modules to gauge—or "get a pulse on"—how other users feel about a content item. Across the online social network, users frequently author communications (e.g., posts, comments) that link to, or otherwise relate to, a specific content item. The number of these communications may be extensive, particularly with respect to content items that may be trending (e.g., news stories, certain movie trailers). The social-networking system may aggregate information from these communications into search-results modules that may each be configured to present specific types of information from these communications. As an example and not by way of limitation, a particular search-results module may be configured to present words (e.g., quotations, noun-phrases) most commonly used in communications relating to a particular video, while a different search-results module may be configured to present sentiments (e.g., "Angry," "Shocked") associated with communications relating to the same video. A search-results interface may present one or more search-results modules that may allow the user to quickly gauge what other users think about a particular content item. As an example and not by way of limitation, a user may access a search-results interface associated with an article about the announcement of a presidential candidate to gauge how other users feel about the candidate or the article itself. In this example, upon reviewing the search-results interface, the user may be able to infer that a large group of users of the online social network support the candidate. For example, the user may see a sentiments-module (as described in further detail below) displaying a sentiment-representation of the "Excited" sentiment (e.g., resulting from a relative majority of user communications using language that indicates excitement) and a mentions-module displaying the words "so inspirational" (e.g., resulting from a relative majority of user communications containing those words). These modules, and others, will be described in further detail below. The search-results interface for a particular content item may allow the user to view a variety of relevant information about the particular content item and user reactions to the particular content item in an accessible manner.

In particular embodiments, the social-networking system may generate a sentiments-module for a search-results interface. The social-networking system may access a plurality of communications authored by one or more users of the online social network. Each of the plurality of communications may be associated with a particular content item and may include some form of commentary (e.g., the text of the communication). Although this disclosure focuses on textual commentary, it contemplates other forms of commentary, including media items (e.g., emojis, stickers, image files, audio files, video files), which the social-networking system may translate into text. As an example and not by way of limitation, in translating an audio file, the social-networking system 160 may use speech-to-text software to recognize any speech within the files as text. For each of the plurality of communications associated with the particular content item, the social-networking system may calculate one or more sentiment-scores. Each of the sentiment-scores for the communication may correspond to a particular sentiment and may be based on a degree to which one or more n-grams of the text of the communication match one or more sentiment-words. Sentiment-words may be n-grams that are determined to be associated with particular sentiments. As an example and not by way of limitation, the n-gram "great" may be a sentiment-word associated with the sentiments "Excited" and "Happy." For each of the plurality of communications, the social-networking system may determine an overall sentiment for the communication based on the calculated sentiment-scores for the communication. As an example and not by way of limitation, a communication with a high sentiment-score for the sentiment "Happy" may receive an overall sentiment of "Happy." The social-networking system may calculate one or more sentiment levels for the particular content item. Each of the sentiment levels may correspond to a sentiment, and each sentiment level may be based on a total number of communications determined to have the overall sentiment of the sentiment level. The social-networking system may generate a sentiments-module that includes one or more sentiment-representations corresponding to one or more overall sentiments. Each sentiment-representation may visually depict a respective sentiment. As an example and not by way of limitation, a sentiment-representation corresponding to the sentiment "Happy" may be a visual depiction of a "smiley face." The sentiments that are represented may be sentiments having sentiment levels greater than a threshold sentiment level. The sentiments-module may allow a user who is interested in the particular content item to quickly understand the emotions or feelings other users are expressing in their communications about the particular content item. This may even help the user understand the particular content item better by framing it in the appropriate emotional context. Although this disclosure focuses on displaying sentiment-representations within a module, it contemplates other applications for the determined sentiments. As an example and not by way of limitation, the determined sentiments may be associated with content items such that the content items may be searched for based on the associated sentiments (e.g., via a search interface, or via the sentiments-module).

In particular embodiments, the social-networking system may generate a quotations-module for a search-results interface. The social-networking system may access a plurality of communications associated with a particular content item. For each of the plurality of communications, the social-networking system may extract, from the text of the communication, one or more quotations from the particular content item. A quotation may be identified, for example, by quotation-indicators such as quotation marks, or by comparing the text of the communication with text from the particular content item. The social-networking system may determine, for each extracted quotation, one or more partitions of the quotation. As an example and not by way of limitation, a quotation may be partitioned into individual sentences or clauses. The social-networking system may group the extracted quotations into one or more clusters based on a respective degree of similarity among their respective one or more partitions. As an example and not by way of limitation, the social-networking system may calculate a degree of similarity based on a Levenshtein distance between two quotations and may group the two quotations together if they are within a threshold degree of similarity. The social-networking system may calculate a cluster-score for each cluster based on a frequency of occurrence of one or more partitions of one or more quotations in the cluster in communications associated with the particular content item. The social-networking system may generate a quotations-module comprising one or more representative quotations, each representative quotation being a quotation from a cluster having a cluster-score greater than a threshold cluster-score. The quotations-module may allow a user who is interested in the particular content item to quickly view popular quotations from the particular content item. This may help the user understand the particular content item better (e.g., by focusing the user's attention on particularly important or relevant portions of the particular content item) or may help the user understand how others view the particular content item (e.g., by displaying what other users felt were important enough to quote in a communication). Although this disclosure focuses on displaying quotations within a module, it contemplates other applications for the extracted quotations. As an example and not by way of limitation, quotations may be displayed as search results outside of any particular module.

In particular embodiments, the social-networking system may generate a mentions-module for a search-results interface. The social-networking system may access a plurality of communications associated with a particular content item. The social-networking system may extract, for each of the plurality of communications, one or more n-grams from the text of the communication. The social-networking system may identify one or more mention-terms from the one or more extracted n-grams. Each mention-term may be defined to include a noun-phrase. To ensure a more diverse content, the social-networking system may confirm that the noun-phrase is not a quotation from the particular content item (e.g., by comparing it against the text of quotations in the quotations-module or against the text of the particular content item itself). The social-networking system may calculate a term-score for each mention-term. The term-score may be based on a frequency of occurrence of the mention-term in the plurality of communications. As an example and not by way of limitation, a mention-term that was included in fifty of the plurality of communications associated with the particular content item may receive a greater term-score than a mention-term that was included in forty of the same set of communications. The social-networking system may generate a mentions-module including one or more mentions. Each of the mentions in the mentions-module may include a mention-term having a term-score greater than a threshold term-score. Each of the mentions may also have text from one or more communications that include the mention-term. As an example and not by way of limitation, a mention may include at least a portion of the text of a communication that includes the mention-term, including text that immediately precedes or follows the mention-term. The mention-term may be in bold, highlighted, or otherwise distinguished from the rest of the included text. In the aggregate, people react to content items in similar ways such that particular n-grams may emerge as commonly used in communications relating to the content items. These commonly used n-grams can be used to summarize the content items, and when the n-grams are provided in context with users' communications, can be used to showcase user reactions in a useful manner. For example, viewing the mentions-module may allow a user who is interested in a particular content item to better understand the particular content item (e.g., by displaying words that others may have used to describe the content item) or to understand how others view the particular content item (e.g., by displaying words that may have been used by others to describe their reaction to the particular content item). Although this disclosure focuses on displaying mentions and mention-terms within a module, it contemplates other applications for the determined mentions and mention-terms. As an example and not by way of limitation, mentions may be displayed as search results outside of any particular module (e.g., a user may search "barack obama" and get a list of mention-terms such as "state of the union" and "signs ObamaCare").

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
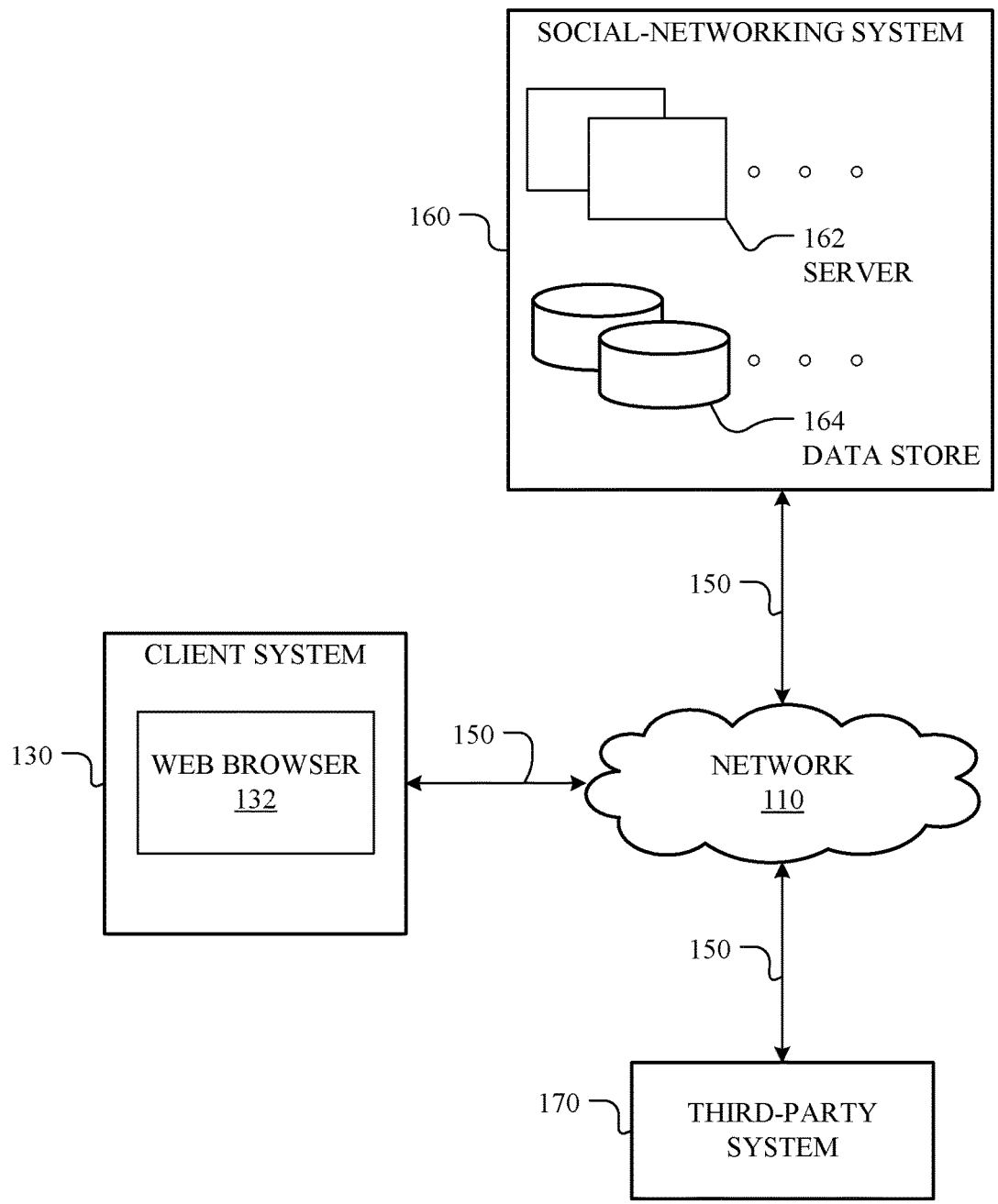
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
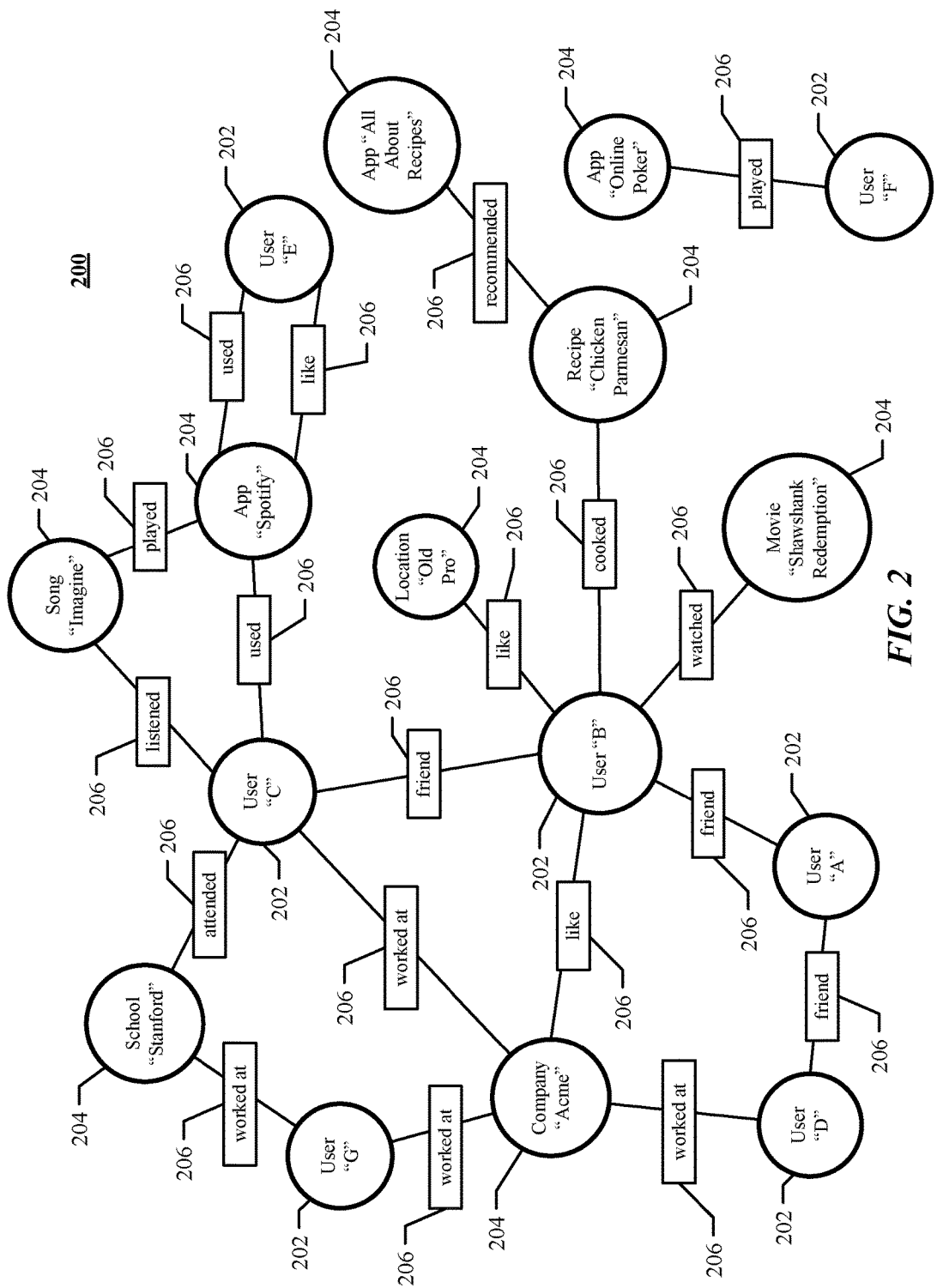
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party server 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), sub scriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "pokemon," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie." As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Search-Results Interfaces for Content-Item-Specific Modules

In particular embodiments, the social-networking system 160 may receive a request from a client system 130 (e.g., of a user of the online social network) associated with a particular content item. A content item may be defined to include a link to an article, a link to a media item, an embedded content object containing a media item, or any other suitable reference to particular content. The social-networking system 160 may identify communications associated with the particular content item. The identified communications may be authored by users of the online social network, or by any other entity (e.g., a third-party entity). The communications may include posts, reshares, comments, messages, or other suitable communications. The social-networking system 160 may generate search-results modules relating to the particular content item. Each of the search-results modules may be of a particular module type. A search-results module may include information from a subset of the identified communications associated with the particular content item. The information included in the search-results module may correspond to the particular module type of the search-results module. As an example and not by way of limitation, a search-results module that may be of a sentiments-module type may include information about the sentiments associated with a subset of the identified communications. The social-networking system 160 may generate a particular search-results module if there exists a number of communications in the subset of identified communications associated with the particular content item greater than a module-specific threshold number of communications. The social-networking system 160 may send to the client system 130 a customized search-results interface for the particular content item that includes one or more of the generated search-results modules. A user of the client system 130 may use these search-results interfaces (so-called "pulse pages") to gauge—or "get a pulse on"— how other users feel about a content item. Across the online social network, users frequently author communications (e.g., posts, comments) that link to, or otherwise relate to, a specific content item. The number of these communications may be extensive, particularly with respect to content items that may be trending (e.g., news stories, certain movie trailers). The social-networking system 160 may aggregate information from these communications into search-results modules that may be each configured to present specific types of information. As an example and not by way of limitation, a particular search-results module may be configured to present words (e.g., quotations, noun-phrases) that may be most commonly used in communications relating to a particular video, while a different search-results module may be configured to present sentiments (e.g., emotions or feelings, such as "Angry" or "Shocked") associated with communications relating to the same video. A search-results interface may present one or more search-results modules that may allow the user to quickly gauge what other users think about a particular content item. As an example and not by way of limitation, a user may access a search-results interface associated with an article about the announcement of a presidential candidate to gauge how other users feel about the candidate or the article itself. In this example, upon reviewing the search-results interface, the user may be able to infer that a large group of users of the online social network support the candidate. For example, the user may see a sentiments-module displaying a sentiment-representation of the "Excited" sentiment. In this example, the "Excited" sentiment may be displayed because there exists a relative majority of user communications indicating excitement (i.e., where the number of user communications indicating excitement is not necessarily greater than half of the communications, but is greater than the number of communications with any other indicated sentiment). The user may also see a mentions-module displaying the words "so inspirational" (e.g., resulting from a relative majority of user communications containing those words). These modules, and others, will be described in further detail below. The search-results interface for a particular content item may allow the user to view a variety of relevant information about the particular content item and user reactions to the content item in an accessible manner.

As used herein, the term "interface" may include a webpage, a user interface of a native application on a computing device, or any other suitable interface. The term "communication" as used herein may include a communication made by a user of an online social network, and may include both private and public communications. Public communications may include posts, reshares, comments, or any other suitable means of communicating to a relatively large group of users. Private communications may include emails, private messages, chats, or any other suitable means of communicating directly to a specific set of users. The term "post" as used herein may include a communication authored by a user on a newsfeed interface or homepage of the online social network, on a user's own page of the online social network (e.g., the user's timeline or wall), on the page of the user's online-social-network connection (e.g., a timeline or wall of the user's first-degree connection or "friend"), on the page of a group on the online social network (e.g., a timeline or wall of a group related to a hobby), or on another suitable interface of the online social network, where the communication does not reference another communication on the online social network. As used herein, the term "reshare" may include a communication authored by a user on the online social network, where the communication references another communication on the online social network (e.g., the reshare may link to or embed a post). As used herein, the term "comment" may include a communication authored by a user on the online social network that responds to another communication on the online social network (e.g., a post or a reshare). The term may also include a reply to a comment. As used herein, the term "private message" may include any nonpublic communications between or among one or more users on the online social network. As used herein, the term "content item" may refer to any form of content (not including communications) that may be shared on the online social network. As an example and not by way of limitation, a content item may be defined to include an article, a description of a product on a commercial website, a media item (e.g., a video clip, an audio clip), or any other suitable content. While this disclosure focuses on describing the presentation of search-results modules in a webpage or other user interface, this disclosure contemplates presenting the search-results modules in other contexts (e.g., pushed, emailed, or otherwise sent to a client system 130). Furthermore, while this disclosure focuses on search-results based on communications associated with content items, this disclosure contemplates search-results based on any other suitable communications, including communications that are not associated with any content items. Furthermore, while this disclosure focuses on describing communications on the online social network, the disclosure contemplates communications on any suitable platform (e.g., a text-messaging platform, an email platform, a Local Area Network).

Figure 3:
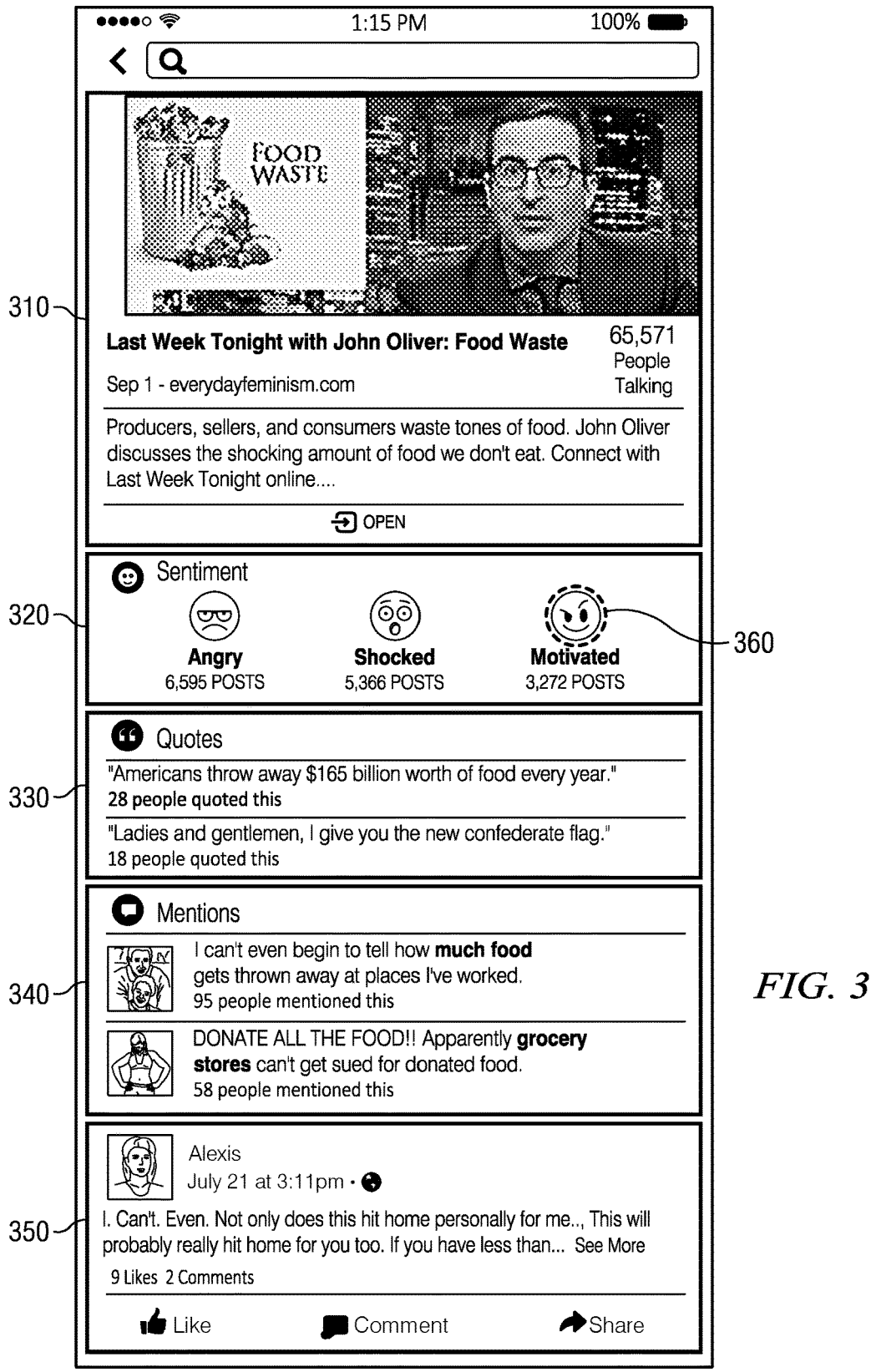
FIG. 3 illustrates an example of a search-results interface with example search-results modules.
Figure 4:
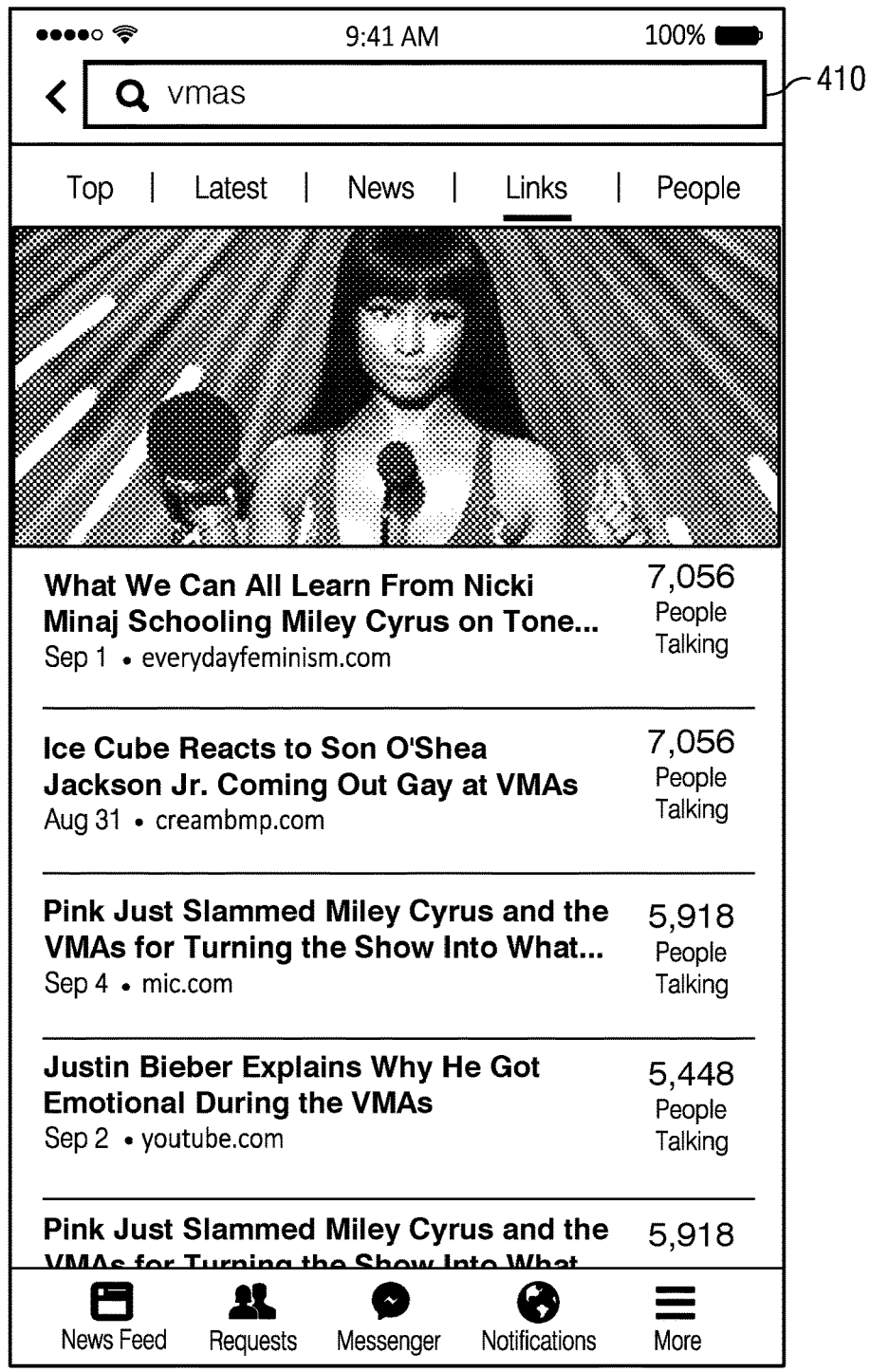
FIG. 4 illustrates an example of a request including a search query that was submitted to the social-networking system.
Figure 5A:
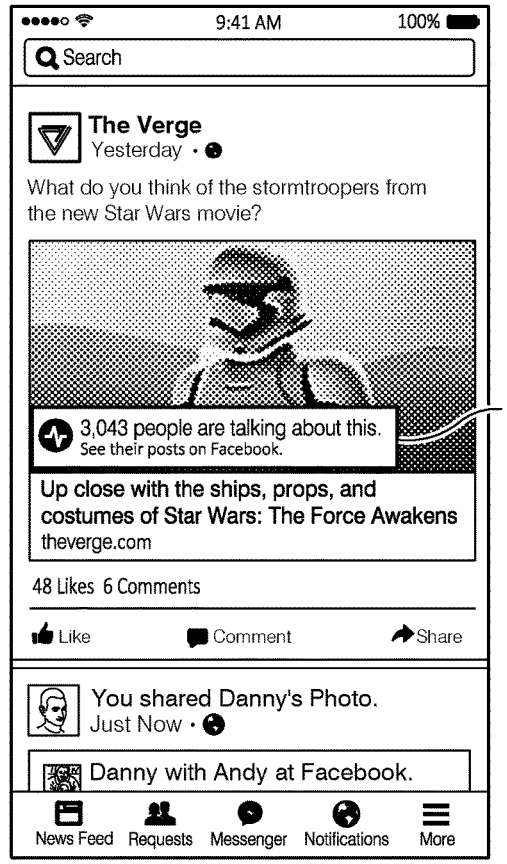
FIGS. 5A and 5B illustrate two example interactive elements displayed on an interface of the online social network.
Figure 5B:
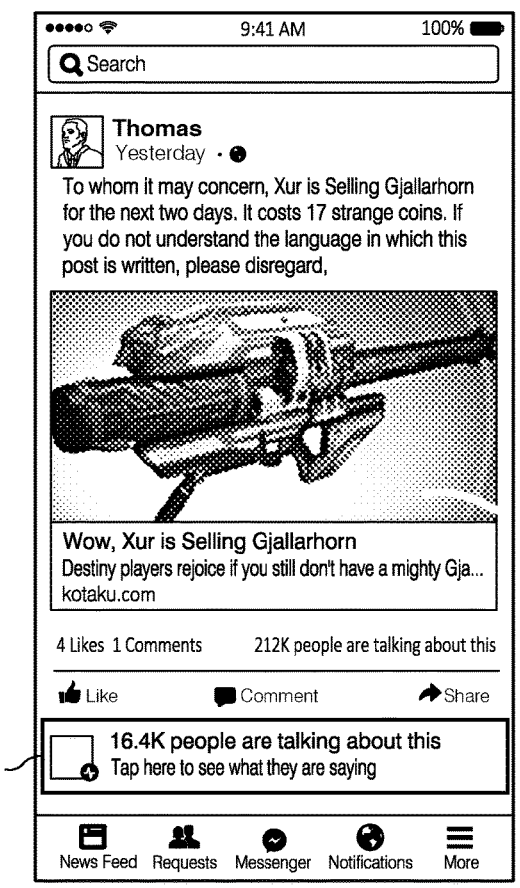
Figure 6:
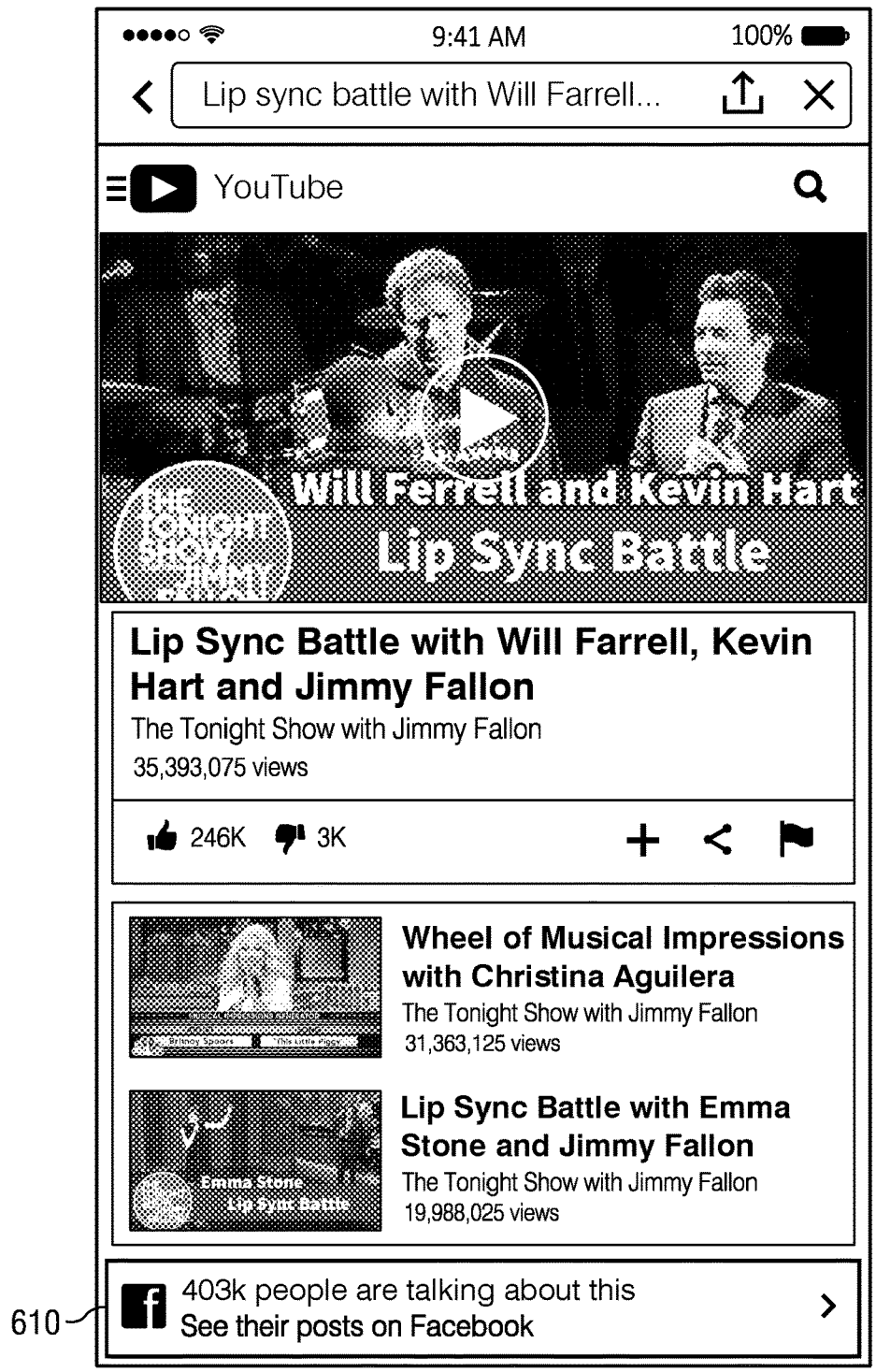
FIG. 6 illustrates an example interactive element displayed as a push notification.

FIG. 3 illustrates an example of a search-results interface with example search-results modules. The example search-results interface in FIG. 3 includes a content item 310 and search-results modules 320, 330, and 340 associated with the content item 310, along with a related user post 350. Search-results modules may refer to a grouping of objects (e.g. user profiles, posts, photos, webpages, etc.) or references to objects identified in response to a search query. More information on search-results modules may be found in U.S. patent application Ser. No. 14/244,748, filed 3 Apr. 2014, and U.S. patent application Ser. No. 14/470,583, filed 27 Aug. 2014, both of which are incorporated by reference. In particular embodiments, the social-networking system 160 may receive a request associated with a particular content item. The request may be from a client system 130 of a user (e.g., a user of the online social network). In particular embodiments, the request may include a search query submitted by the client system 130 of the user. The search query may be a text string either entered by the user into a query field or otherwise inputted in any suitable manner (e.g., by selecting among auto-suggested search queries). The search query may be a structured or unstructured query, as described above. FIG. 4 illustrates an example of a request including a search query that was submitted to the social-networking system 160. The search query may include one or more n-grams associated with a particular content item of a search-results interface. As an example and not by way of limitation, referencing FIG. 4, the user may have entered the search query "vmas" in the query field 410, which may be an n-gram associated with the MTV Video Music Awards ceremony. An n-gram may be associated with a particular content item if it is associated with a topic that the particular content item is associated with on the online social network. As an example and not by way of limitation, the social-networking system 160 may determine that an n-gram of a search query is associated with one or more topics by accessing an index that indexes topics with associated keywords and then searching for keywords that match an n-gram of a search query. In this example, the social-networking system 160 may determine that a content item is associated with one or more topics in much the same way by extracting n-grams associated with the content item (e.g., from associated communications, metadata of the content item, any text that is part of the content item). The social-networking system 160 may determine that an n-gram of a search query is associated with a content item if there is a sufficient match between their respective keywords. More information on topic association and keyword matching may be found in U.S. patent application Ser. No. 13/167,701, filed 23 Jun. 2011, and U.S. patent application Ser. No. 14/585,782, filed 30 Dec. 2014, each of which is incorporated by reference. The social-networking system 160 may accordingly associate the request with content items related to the Video Music Awards. In particular embodiments, the request may include a user selection of an interactive element. The interactive element may be generated for the particular content item if a search-results interface may be generated for the particular content item. Once generated, the interactive element may be displayed to the user to allow the user to select it. The interactive element may be displayed in any suitable manner on a interface of the online social network. FIGS. 5A and 5B illustrate two example interactive elements 510 and 520 displayed on a interface of the online social network. The interactive element may alternatively be displayed as a notification (e.g., a push notification) outside of a interface of the online social network. FIG. 6 illustrates an example interactive element 610 displayed as a notification. In sending an interactive element as a notification, an application associated with the social-networking system 160 may be running in the client system 130 (e.g., by running as a background application). The application may send the interactive element to the client system 130 for display to the user. As an example and not by way of limitation, referencing FIG. 6, the interactive element 610 may be displayed when a search-results interface is generated for the video associated with the interface currently being viewed by the user (e.g., "Lip Sync Battle with Will Ferrell, Kevin Hart and Jimmy Fallon", as illustrated in FIG. 6) on a third-party website or application (e.g., on a web browser application, an application associated with a third-party video-sharing platform). An interactive element may be selected by the user in any suitable manner (e.g., tapping it on a touchscreen, performing a suitable gesture on or off the screen, clicking on it using an input device). Although this disclosure describes receiving particular requests from a particular system in a particular manner, this disclosure contemplates receiving any suitable requests from any suitable system in any suitable manner.

In particular embodiments, the social-networking system 160 may identify one or more communications authored by one or more users of the online social network. Each identified communication may be associated with the particular content item. For the purposes of this disclosure, a communication is defined to be associated with a content item if it includes the content item (e.g., embedded as a content object), a link to an instance of the content item, or otherwise references the content item (e.g., a communication including a threshold amount of text matching keywords associated with the content item). A communication may also be associated with a content item if it is a response (e.g., a comment, a responsive private message) to a communication that is associated with a content item. As an example and not by way of limitation, the social-networking system 160 may identify communications that include a link to a particular article. The identification of a communication may be further based on a degree of separation or social-graph affinity between the querying user and the author of the communication (or between the user and the communication itself). As an example and not by way of limitation, the identified communications may include only communications authored by first-degree connections of the querying user. As another example and not by way of limitation, the identified communications may include only communications authored by users for which the querying user has a threshold level of affinity (e.g., as determined by an affinity coefficient). In particular embodiments, the communications may be identified by first accessing a communication index. The communication index may index a plurality of content items and, for each content item, one or more communications associated with the content item. As an example and not by way of limitation, referencing FIG. 3, the communication index may index the content item 310 with all posts associated with the content item 310. Although this disclosure describes identifying particular communications in a particular manner, this disclosure contemplates identifying any suitable communications in any suitable manner.

In particular embodiments, the social-networking system 160 may generate one or more search-results modules related to the particular content item. As an example and not by way of limitation, referencing FIG. 3, the social-networking system 160 may have generated search-results modules 320, 330, and 340, which are all related to the content item 310. Each of the generated search-results modules may be of a particular module type and may include information from a subset of the identified communications. The information in each search-results module may correspond to the particular module type of the search-results module. As an example and not by way of limitation, referencing FIG. 3, the search-results module 320 may include information related to one or more sentiments determined to be associated with the subset of identified communications. As another example and not by way of limitation, again referencing FIG. 3, the search-results module 330 may include information related to quotations extracted from the subset of identified communications. In particular embodiments, the social-networking system 160 may generate a particular search-results module when a number of communications in the subset of identified communications for the particular search-results module is greater than a threshold number of communications. As an example and not by way of limitation, referencing FIG. 3, the search-results module 320 may be generated only if the number of identified communications in the subset (e.g., communications associated with the content item 310 for which sentiments may be determined) is greater than ten thousand. In this example, the subset of identified communications includes at least 15,233 communications (6,595 angry posts+5,366 shocked posts+3,272 motivated posts), which is greater than ten thousand communications. This may prompt the social-networking system 160 to generate the search-results module 320. In particular embodiments, the social-networking system 160 may generate a particular search-results module when a number of communications in the subset of identified communications that converge on a single result in the search-results module is greater than a threshold number of communications. As an example and not by way of limitation, again referencing FIG. 3, the search-results module 320 may be generated only if there exists at least one overall sentiment (i.e., a single result) that is associated with a number of identified communications in the subset that is greater than six thousand. In this example, the social-networking system 160 may generate the search-results module 320, because at least the "Angry" sentiment is an overall sentiment that is associated with more than six thousand communications (at least 6,595 posts). The threshold number of communications may be module specific, in that each type of module may have its own module-specific threshold number, which may be different depending on the module type of a particular search-results module. The module-specific threshold number may correspond to the number of communications in the subset of identified communications for the search-results module (i.e., communications from which information relevant to the specific module can be extracted). As an example and not by way of limitation, referencing FIG. 3, the search-results module 320 may have a module-specific threshold number of one thousand, while the search-results module 330 may have a module-specific threshold number of ten. In this example, the social-networking system 160 may generate the search-results module 320 if there are 1,001 communications for which an overall sentiment is determined, and may generate the search-results module 330 if there are eleven communications for which a quotation is extracted. Although this disclosure describes generating particular modules in a particular manner, this disclosure describes generating any such items that are suitable in a suitable manner.

In particular embodiments, the social-networking system 160 may send a customized search-results interface (e.g., a search-results page) for the particular content item requested from the client system 130. The customized search-results interface may comprise one or more search-results modules. The search-results interface may also include other related items such as related user post 350 or links to related content items. The search-results interface may be sent to the client system 130 that sent the request associated with the particular content item. In particular embodiments, a search-results module may be generated even if there are not a threshold number of posts, but it may only be sent to the client system 130 if the threshold is exceeded. In particular embodiments, the search-results module may be sent to the client system 130 even if the threshold is not exceeded if the querying user submits a suitable request. As an example and not by way of limitation, the querying user who is viewing a content item's web interface that does not display one or more of the search-results modules (e.g., because the number of identified communications do not exceed the respective module-specific threshold numbers) may select an interactive element labeled "See More" (or a suitable equivalent), prompting the social-networking system 160 to generate and/or send the missing search-results modules for the content item. The social-networking system 160 may only send a missing search-results module if there is at least one communication from which information relevant to the module type can be extracted (e.g., for a sentiments-module, at least one communication for which a sentiment can be determined). The search-results modules on the search-results interface may be arranged in any suitable manner. As an example and not by way of limitation, the search-results module may be stacked vertically or horizontally. The search-results modules may not all appear on the search-results interface at once and may require a further user action to cause one or more of the modules to appear. The order in which the one or more modules are displayed may be determined, at least in part, by calculating a module-score for the one or more search-results modules to be displayed. The module-score may represent a relevance or quality of the module, and may provide a way for the social-networking system to determine an optimal order in which to display the various search-results modules. The module-score may be based on information in a user-preference file associated with the first user. The user-preference file may be stored on the client system 130, a server of the social-networking system 160, a third-party system 170, or any combination thereof. The user-preference file may contain preference information specified by the user. As an example and not by way of limitation, referencing FIG. 3, the user may have indicated a preference for search-results modules that are of the same type as the search-results module 320 (i.e., sentiment-modules). This information may be stored in the user-preference file. The module-score may be based on a level of engagement among users of the online social network. The level of engagement may be a measure of how much users engage with particular search-results modules. The social-networking system 160 may award a higher module-score to a search-results module if it has a relatively high level of engagement than otherwise. The social-networking system 160 may determine the level of engagement based on the amount of time users spend on particular search-results modules (which may be determined by measuring the amount of time users spend on a portion of the screen, or on a view state in the case of a mobile client system, that includes particular search-results modules), the number of interactions (e.g., expressing social signals such as "likes" or comments, selection of on interactive elements) users have with particular search-results modules, any other suitable metric for measuring user engagement or interest with particular search-results modules, or any combination thereof. As an example and not by way of limitation, referencing FIG. 3, the search-results module 340 may allow users to "like" particular "mentions" (see below for a further description of mentions). In this example, the social-networking system 160 may keep track of the number of users that have used the search-results module 340 to like one or more mentions and base its determination of the module-score accordingly (e.g., awarding a higher module-score to the search-results module 340 if there were a relatively high number of users who used the search-results module to like mentions). As another example, again referencing FIG. 3, the search-results module 320 may include one or more interactive elements, which may be in the form of a sentiment-representation such as the sentiment-representation 360. The social-networking system 160 may keep track of the number of users selecting the one or more interactive elements (e.g., the sentiment-representation 360) and base its determination of the module-score accordingly. As yet another example and not by way of limitation, referencing FIG. 3, the search-results module 320 may also include an interactive element (not shown) that allows a user to like a particular sentiment. The social-networking system 160 may keep track of the number of users like sentiments in the search-results module and base its determination of the module-score accordingly. In particular embodiments, the level of engagement may be based on how much users engage with a particular module type. As an example and not by way of limitation, referencing FIG. 3, the social-networking system 160 may determine how much users engage with search-results modules that are of the same type as search-results module 320 (e.g., determining that users often activate interactive elements within such modules). The level of engagement may be measured over a defined period of time or may be measured instantaneously (reflecting the most current level of engagement with search-results modules on the online social network). In particular embodiments, the module-score may be based on a historical level of engagement by the querying user with the respective particular search-results module or the respective module type. As an example and not by way of limitation, referencing FIG. 3, the user may have often engaged in the past with search-results modules that are of the same type as search-results module 320. In this example, the search-results module 320 may be awarded a relatively high module-score. The user's historical level of engagement may be stored with the user-preference file associated with the user. In particular embodiments, the module-score may be based on the particular content item. For certain content items, by the nature of the content they contain, certain types of information (reflected in certain search-results modules) may be more interesting than other information (reflected in other search-results modules). As an example and not by way of limitation, a Supreme Court written opinion may provide interesting quotations that may have been picked upon by users of the online social network. In this example, a search-results module containing information related to quotations from the Supreme Court written opinion may receive a relatively high module-score. In particular embodiments, the module-score may be based on demographic information (e.g., age, gender, race, nationality, location) of the querying user. As an example and not by way of limitation, referencing FIG. 3, a fifteen-year old user may be more interested in the search-results module 340 (i.e., a mentions-module, which may highlight the terms most commonly mentioned in communications) than the search-results module 330 (i.e., a quotations-module, which may present the quotations most commonly present in communications). The converse may be true of a fifty-year old user. In the same example, this information about the relative interests in the search-results modules among different age groups may be based on pre-set parameters or may be determined dynamically by the social-networking system 160 (e.g., by measuring relative levels of engagement among users of the different demographic groups). In particular embodiment, the calculated module-score may be a function of any combination of the factors described above or any other suitable factor on which the module-score may be based. As an example and not by way of limitation, the function for calculating a module-score may be represented by the following expression: $f(m_1,m_2,m_3)$, where $m_1$, $m_2$, and $m_3$ are three different factors. The calculated module-score may alternatively be a sum of different functions that may be weighted in a suitable manner (e.g., the weights being pre-determined by the social-networking system 160). As an example and not by way of limitation, the function for calculating a module-score may be represented by the following expression: $A f_1(m_1,m_2)+B f_2(m_3)$, where $m_1$, $m_2$, and $m_3$ are three different factors, and where A and B are two different weights. Although this disclosure describes sending a particular interface in a particular manner, this disclosure contemplates sending any suitable interface in any suitable manner.

In particular embodiments, the order of search-results modules may also be pre-determined. As an example and not by way of limitation, referencing FIG. 3, the search-results module 320, if generated and sent, may always be set to appear as the first search-results module. Alternatively, in the same example, the search-results module 320 may simply receive an increase in its module-score, which may yet be overcome by a different search-results module that nonetheless receives a higher module-score.

Figure 7:
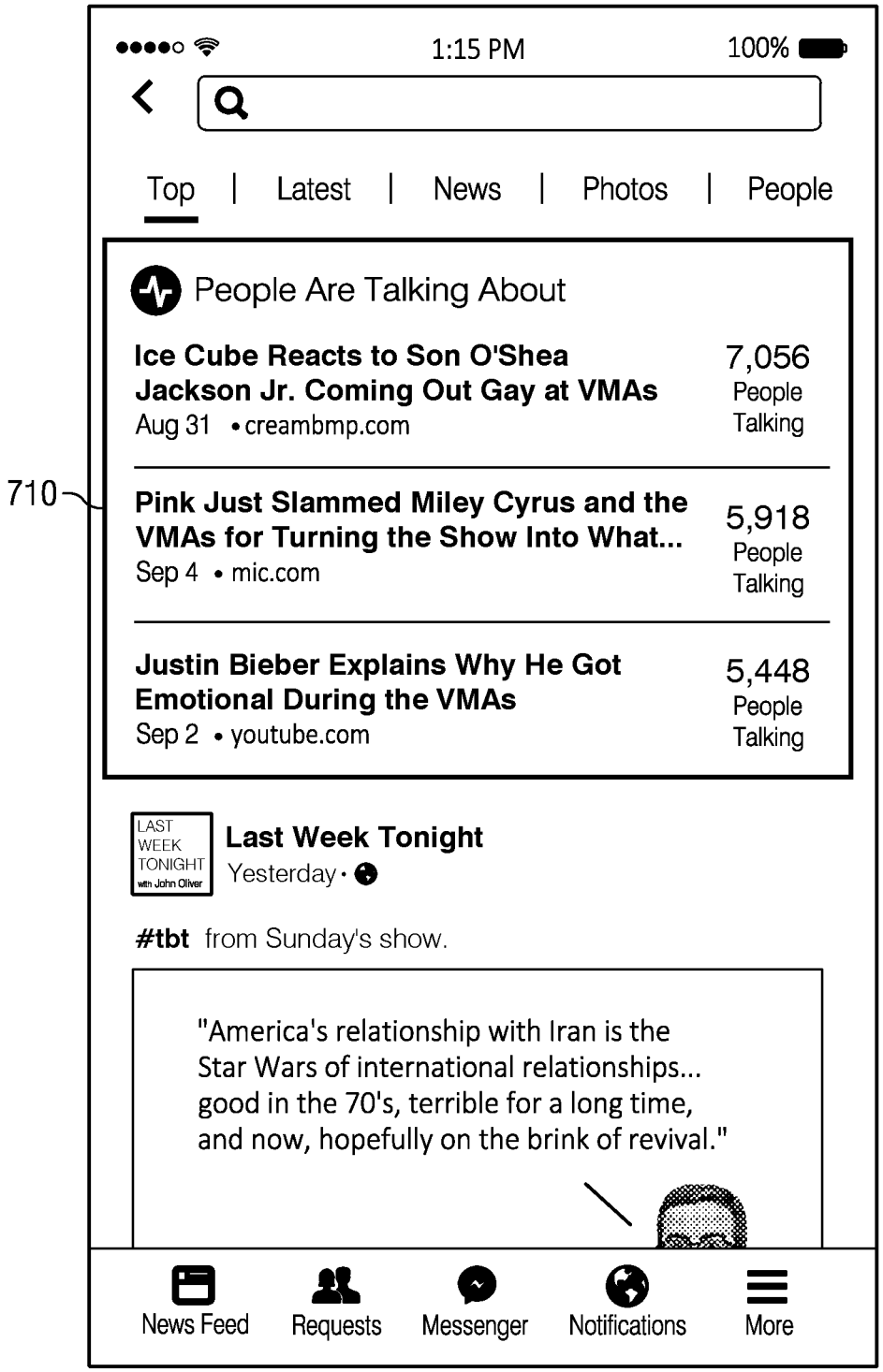
FIG. 7 illustrates an example popular-links module.

In particular embodiments, the social-networking system 160 may generate a popular-links module that may be sent to the client system 130. FIG. 7 illustrates an example popular-links module. The popular-links module may include one or more references to one or more other content items. A reference to a content item may include a reference to a search-results interface or other suitable interface for the content item. Each of the other content items referenced in the popular-links module may have greater than a threshold number of associated communications. The threshold number may be a threshold score or rank, such that the popular-links module may only include references to content items with the highest number of associated communications. As an example and not by way of limitation, the popular-links module may include only references to content items that are determined to be currently "trending," i.e., content items with the highest number of associated communications within a specific timeframe (e.g., the past 48 hours). As another example and not by way of limitation, the popular-links module may include only references to content items that are associated with topics that are determined to be currently trending. More information on determining trending items such as topics may be found in U.S. patent application Ser. No. 14/858,366, filed 18 Sep. 2015, which is incorporated by reference. As yet another example and not by way of limitation, the popular-links module may include only references to the three content items with the highest number of associated communications. In particular embodiments, the popular-links module may be sent in response to a search query (e.g., as part of a generic search-results interface) and may display links that are related, or otherwise relevant, to the search query. As an example and not by way of limitation, referencing FIG. 7, the popular-links module 710 may be sent in response to a search query including the n-gram "VMAs." In particular embodiments, a popular-links module may be sent along with the search-results interface that the user is currently viewing. The popular-links module may include links related to the content item of the search-results interface being viewed. As an example and not by way of limitation, referencing FIG. 3, the social-networking system 160 may generate a popular-links module related to the content item 310, which may include a link to a video related to the content item 310 (e.g., a user's reaction video on John Oliver's comments regarding food waste), a link to a different search-results interface related to the content item 310 (e.g., a search-results interface for a book about food waste generally), or a link to any other suitable search-results interface (e.g., a trending-topics interface). The popular-links module may include links that are not related to the content item of the search-results interface being viewed. Such links may instead simply be related to content items that are popular (e.g., content items for which a threshold number of users have authored communications within a specified period) on the online social network. Although this disclosure describes generating a particular popular-links module in a particular manner, this disclosure contemplates generating any similarly suitable module in any suitable manner.

In particular embodiments, the information of one or more search-results modules may be altered based on a user selection made by the user of the client system 130. The user selection may include the selection of an interactive element. The user selection may occur before or after the search-results modules or the associated search-results interface is sent to the user. As an example and not by way of limitation, referencing FIG. 3, the sentiment-representation 360 (e.g., representing the sentiment "Motivated") may be an interactive element, in which case the user may select the sentiment-representation 360. In this example, the information of the search-results modules 330 and 340 may be altered in a manner suitably responsive to the sentiment that was selected. For example, the search-results modules 330 and 340 may be updated in response to a user selecting the "Motivated" sentiment-representation 360 to show only quotations and mentions, respectively, that are associated with the sentiment "Motivated" (i.e., quotations and mentions that are extracted from communications determined to have the overall sentiment "Motivated," the determination of which is further described below).

In particular embodiments, the social-networking system 160 may send, to the client system 130 of the user, communications or content items responsive to a search query corresponding to one or more particular sentiments. A search query may correspond to a particular sentiment if it includes one or more n-grams that are synonymous with, or are otherwise closely associated with, the particular sentiment. The social-networking system 160 may access a communication index that may index communications and, for each communication, one or more sentiments associated with the communication. The social-networking system 160 may identify one or more responsive communications from the communication index. The responsive communications may be communications that are associated with one or more sentiments that match the particular one or more sentiments corresponding to the search query. The social-networking system 160 may send one or more of the responsive communications to the client system 130 of the user. As an example and not by way of limitation, the user of the client system 130 may enter a search query including the n-gram "motivational." In this example, the social networking system 160 may return communications associated with the sentiment "Motivated." In particular embodiments, the social-networking system 160 may send content items, alternatively or in addition to communications, using a similar process. In such an embodiment, the social-networking system 160 may access an index (e.g., the communication index) that indexes content items with respective one or more sentiments (e.g., as determined by their respective associated communications, as determined by metadata of the content item). The social-networking system 160 may then identify responsive content items in a manner similar to that in which it identifies responsive communications. As an example and not by way of limitation, the social-networking system 160 may return links to content items (e.g., video files, audio files) that are associated with the sentiment "Motivated" in response to a search query including the n-gram "motivational." In particular embodiments, the social-networking system 160 may send, to the client system 130 of the user, search-results modules with information from the responsive communications or content items. In particular embodiments, the social-networking system 160 may update search-results modules that may have already been generated or sent to the user. As an example and not by way of limitation, referencing FIG. 3, a user who may be viewing the search-results interface with the search-results modules 320, 330, and 340 may enter a search query including the n-gram "motivational," in response to which the social-networking system 160 may alter the contents of search-results modules 330 and 340. In particular embodiments, the social-networking system 160 may perform any combination of the above in response to a search query corresponding to one or more sentiments.

One or more of the search-results modules may be updated after they are sent to reflect the latest information from the latest subset of identified communications. These updates may be regular (e.g., occurring periodically at specific time intervals). Alternatively or additionally, it may be updated whenever a threshold number of update-communications are newly identified (e.g., as new communications are made) as being within the subset of identified communications for a search-results module. This threshold number of update-communications may be module specific. As an example and not by way of limitation, the search-results module 320 may be updated when there are twenty communications newly identified as being within the subset for the search-results module 320. In the same example, the search-results module 340 may be updated when there are five communications newly identified as being within the subset for the search-results module 340. In particular embodiments, a search-results module may be updated by generating and sending a replacement search-results module containing updated information. As an example and not by way of limitation, a replacement search-results module may be sent every five minutes with one or more other posts replacing one or more of the displayed posts. In particular embodiments, a search-results module may be updated by sending updated information to add to or replace at least some of the information in a search-results module. As an example and not by way of limitation, referencing FIG. 3, the search results module 320 may be updated by sending new information about the number of angry communications (e.g., posts, in this instance) that are associated with content item 310, replacing the number "6,595" with the number "6,596" to reflect the fact that an additional angry communication has been authored on the online social network.

Figure 8:
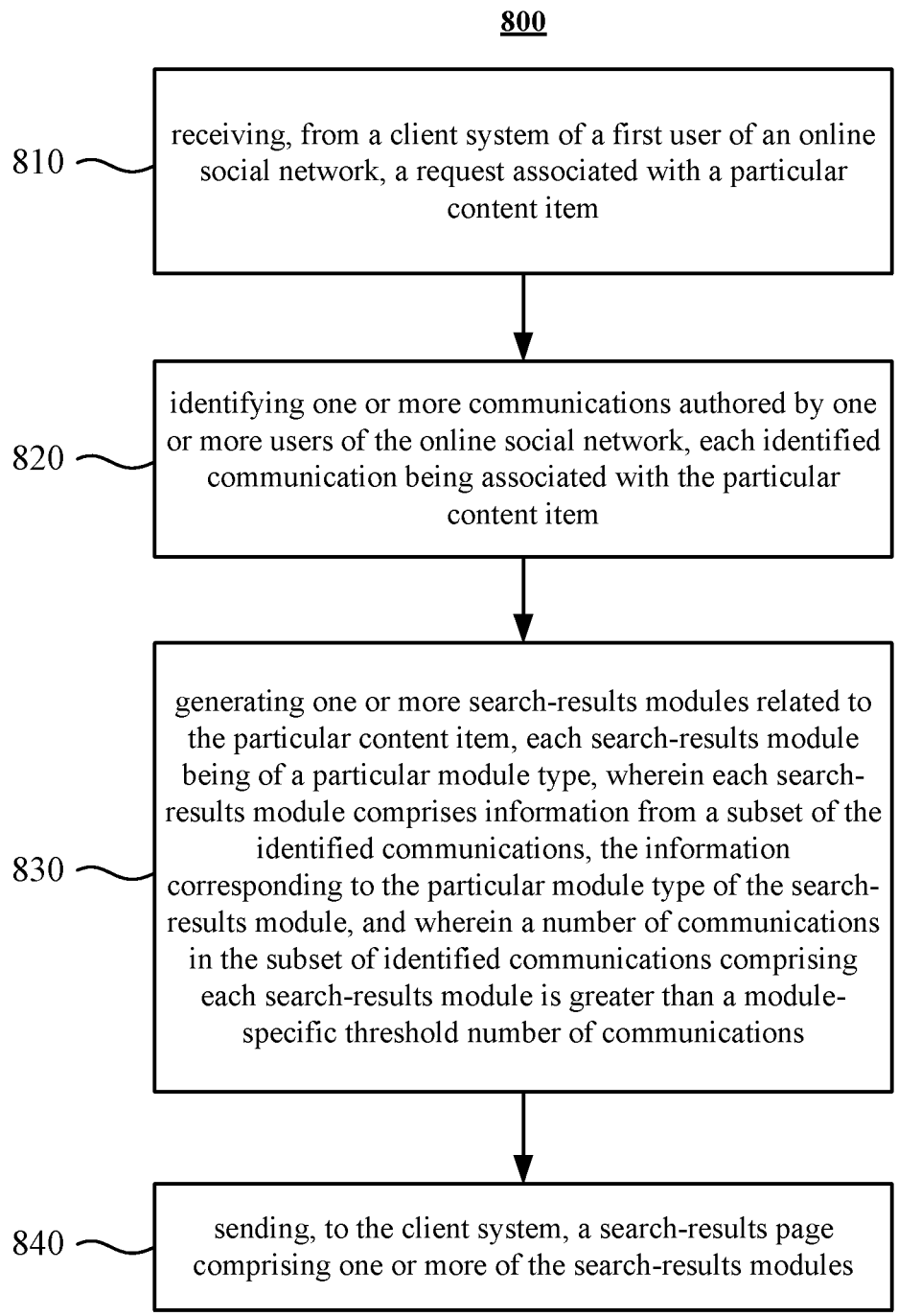
FIG. 8 illustrates an example method for generating one or more search-results modules as parts of a search-results interface.

FIG. 8 illustrates an example method 800 for generating one or more search-results modules as parts of a search-results interface. The method may begin at step 810, where the social-networking system 160 may receive, from a client system 130 of a first user of an online social network, a request associated with a particular content item. At step 820, the social-networking system 160 may identify one or more communications authored by one or more users of the online social network, each identified communication being associated with the particular content item. At step 830, the social-networking system 160 may generate one or more search-results modules related to the particular content item, each search-results module being of a particular module type, wherein each search-results module comprises information from a subset of the identified communications, the information corresponding to the particular module type of the search-results module, and wherein a number of communications in the subset of identified communications comprising each search-results module is greater than a module-specific threshold number of communications. At step 840, the social-networking system 160 may send, to the client system 130, a search-results interface comprising one or more of the search-results modules. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for generating one or more search-results modules as parts of a search-results interface including the particular steps of the method of FIG. 8, this disclosure contemplates any suitable method for sending data corresponding to media items based on a user input including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Sentiments-Modules

In particular embodiments, the social-networking system may generate a sentiments-module for a search-results interface. As discussed previously, the social-networking system 160 may access a plurality of communications authored by one or more users of an online social network. Each of the plurality of communications may be associated with a particular content item and may include some form of commentary, which may include a text of the communication. Although this disclosure focuses on textual commentary, it contemplates other forms of commentary, which may include media items (e.g., emojis, stickers, image files, audio files, video files), which the social-networking system 160 may translate into text. As an example and not by way of limitation, in translating an audio file, the social-networking system 160 may use speech-to-text software to recognize any speech within the files as text. As an example and not by way of limitation, the social-networking system may translate a scanned image of a document into text using optical-character-recognition software. For each of the plurality of communications, the social-networking system 160 may calculate one or more sentiment-scores. Each of the sentiment-scores for the communication may correspond to a particular sentiment and may be based on a degree to which one or more n-grams of the text of the communication match one or more sentiment-words. Sentiment-words may be n-grams that are determined to be associated with particular sentiments. As an example and not by way of limitation, the n-gram "great" may be a sentiment-word associated with the sentiments "Excited" and "Happy." For each of the plurality of communications, the social-networking system 160 may determine an overall sentiment for the communication based on the calculated sentiment-scores for the communication. As an example and not by way of limitation, a communication with a high sentiment-score for the sentiment "Happy" may receive an overall sentiment of "Happy." The social-networking system 160 may calculate one or more sentiment levels for the particular content item. Each of the sentiment levels may correspond to a sentiment. Each sentiment level may be based on a total number of communications determined to have the overall sentiment of the sentiment level. The social-networking system 160 may generate a sentiments-module that includes one or more sentiment-representations corresponding to one or more overall sentiments. Each of the sentiment-representations may visually depict a respective sentiment. The sentiments that are represented may be sentiments having sentiment levels greater than a threshold sentiment level. The sentiments-module may allow a user who is interested in the particular content item to quickly understand how others feel about the particular content item. This may even help the user understand the particular content item better by framing it in the appropriate emotional context. Although this disclosure focuses on displaying sentiment-representations within a module, it contemplates other applications for the determined sentiments. As an example and not by way of limitation, the determined sentiments may be associated with content items such that the content items may be searched for based on the associated sentiments. As another example and not by way of limitation, adhering to privacy constraints (e.g., a user may opt in or opt out of having sentiment-related information associated with the user used in the online social network for any or all purposes), the sentiments associated with a particular content item (e.g., an advertisement video for a new car) and information related to the users (e.g., demographic information) whose communications expressed particular sentiments may be compiled into a report for interested parties (e.g., a company may study such a report to understand that a particular type of car commercial or a particular car appeals to a certain demographic more than other demographics).

In particular embodiments, the social-networking system 160 may access a plurality of communications authored by one or more users of an online social network. Each of the accessed communication may be associated with a particular content item. The accessed communications may include a text of the communication. The text of the communication may reflect user commentary relating to the particular content item. In particular embodiments, an accessed communication may alternatively or additionally include other forms of commentary such as media items (e.g., emojis, stickers, image files, audio files, video files, image files). In such cases, the social-networking system 160 may translate media items into text. Translating a media item into text may include substituting the media item with one or more n-grams or keywords associated with the media item. More information on translating media items in communications may be found in U.S. patent application Ser. No. 14/952,707, filed 25 Nov. 2015, which is incorporated by reference. Translating a media item into text may also include the use of software that recognizes text within a media item. As an example and not by way of limitation, in translating an audio or video file, the social-networking system 160 may use speech-to-text software to recognize any speech within the files as text. As another example and not by way of limitation, in translating an image file, the social-networking system 160 may be able to analyze image characteristics such as pixel values or gradients to determine shapes and may then recognize persons (e.g., a particular user) or concepts (e.g., the Eiffel Tower) that the image represents. The social-networking system 160 may then translate the image into text describing the person (e.g., a name of the user, "John Smith"; descriptors of the user, "male," "26-year-old") or text describing the concept (the text "eiffel tower," "france") being represented in the image. More information about analyzing images to recognize persons or concepts may be found in U.S. patent application Ser. No. 13/959,446, filed 5 Aug. 2013, and U.S. patent application Ser. No. 14/983,385, filed 29 Dec. 2015, which are incorporated by reference. As another example and not by way of limitation, in translating an image file that contains text (e.g., a scanned image of a document), the social-networking system 160 may use optical-character-recognition software to recognize text within the file. In particular embodiments, an accessed communication may include both text and other forms of commentary. Although this disclosure describes accessing particular communications in a particular manner, this disclosure contemplates sending any suitable communications in any suitable manner.

In particular embodiments, the social-networking system 160 may calculate, for each of the plurality of communications, one or more sentiment-scores corresponding to one or more sentiments, respectively. The sentiment-score for a communication may be a quantitative measure of the amount of a respective sentiment in the communication (e.g., on a scale of 0 to 1, with 1 representing the highest amount). In calculating a sentiment-score for a particular communication, the social-networking system 160 may extract the n-grams associated with the communication. The sentiment-score may be based on a degree to which one or more of the extracted n-grams of the text of the communication (or the n-grams associated with other forms of commentary in the post such as media items) match one or more sentiment-words associated with the one or more sentiments. Sentiment-words may be n-grams that are determined to be associated with particular sentiments. The social-networking system 160 may determine that a particular sentiment-word is associated with one or more sentiments through a variety of ways. In particular embodiments, the social-network may access a dictionary or index that is pre-populated with such associations (e.g., the sentiment word "wow" may be indexed with the sentiment "Excited"). In particular embodiments, the social-networking system 160 may access a sentiment-word index that is, or has been, populated using information from communications on the online social network. The sentiment-word index may index sentiment-words with their respective sentiments. The social-networking system 160 may extract n-grams from one or more communications. The one or more communications from which the n-grams are extracted may be determined to be associated with particular sentiments based on sentiment expressions in the communications. As an example and not by way of limitation, a user may author a post including the n-gram "fomo" (an acronym for "Fear of Missing Out") and express a particular sentiment through a user selection (e.g., by selecting the status "feeling anxious" among a list of statuses in a dropdown menu). In this example, the social-networking system 160 may associate the n-gram "fomo" with the sentiment "Anxious" (e.g., in an index), based on the fact that the status "feeling anxious" may itself be associated with that sentiment. As another example and not by way of limitation, a user may author the post including the n-gram "fomo" but may also express a sentiment by including the hashtag "#anxious" or "#concerned." In this example, the social-networking system 160 may associate the n-gram "fomo" with the sentiment "Anxious," based on the fact that the hashtag used may itself be associated with that sentiment. As another example and not by way of limitation, a user may author the post including the n-gram "fomo" and may express a sentiment by including the text "anxious" or "nail-biter" (i.e., an idiomatic expression that is associated with anxiousness). In this example, the social-networking system 160 may associate the n-gram "fomo" with the sentiment "Anxious," based on the fact that the text (i.e., "anxious" or "nail-biter") may be associated with that sentiment (e.g., if they are already in the sentiment-word index from a past iteration of this process). In these examples and for the purpose of this disclosure, the n-gram "fomo" may be a sentiment-word for the sentiment "Anxious." The sentiment-word index may be updated regularly—for example, as new communications are authored. The extraction of n-grams or text in determining sentiment-words to populate the sentiment-word index may involve the use of a term frequency-inverse document frequency (TF-IDF) analysis of the text of the communication (or the n-grams associated with other forms of commentary in this post such as media items) in relation to a set of communications. The TF-IDF is a statistical measure used to evaluate how important a word is to a document (e.g., a communication) in a collection or corpus (e.g., a set of communications). The importance increases proportionally to the number of times a word appears in a particular document, but is offset by the frequency of the word in the corpus of documents. The importance of a word in a particular document is based in part on the term count in a document, which is simply the number of times a given term (e.g., a word) appears in the document. This count may be normalized to prevent a bias towards longer documents (which may have a higher term count regardless of the actual importance of that term in the document) and to give a measure of the importance of the term t within the particular document d. Thus we have the term frequency tf(t,d), defined in the simplest case as the occurrence count of a term in a document. The inverse-document frequency (idf) is a measure of the general importance of the term which is obtained by dividing the total number of documents by the number of documents containing the term, and then taking the logarithm of that quotient. A high weight in TF-IDF is reached by a high term frequency in the given document and a low document frequency of the term in the whole collection of documents; the weights hence tend to filter out common terms. Performing a TF-IDF analysis may improve the efficiency of the index and prevent false positives. As an example and not by way of limitation, for a post with the text "I wish I were there. Feeling the FOMO. #anxious," a TF-IDF analysis may determine that the n-gram "fomo" should be extracted, where it has a high importance within the post. By contrast, a TF-IDF analysis may determine that the n-grams "i" and "the" should not be extracted, where these word have a low importance within the post (because they are common words in many posts, or communications generally). Although this disclosure describes calculating particular scores in a particular manner, this disclosure contemplates calculating any suitable scores in any suitable manner.

In calculating the sentiment-scores for a communication, the social-networking system 160 may attempt to match the n-grams of the communication with sentiment-words in the sentiment-word index. As mentioned above, the social-networking system 160 may then score the post as a whole based on the degree to which the n-grams of the communication match sentiment-words. The degree of the match may correspond to the number of n-grams that match one or more sentiment-words. As an example and not by way of limitation, if several n-grams match sentiment-words associated with the sentiment "Happy," there may be a high degree of matching with that sentiment. The degree of the match may alternatively or additionally correspond to the quality of the match between an n-gram and a sentiment-word. As an example and not by way of limitation, the n-gram "waiting" may be a weak match for the sentiment-word "fomo," whereas the n-gram "fomooo" may be a strong match for the sentiment-word "fomo." The degree of the match may also correspond to the extent to which the matching sentiment-word itself matches the respective sentiment. As an example and not by way of limitation, the sentiment-words "anxious" and "fomo" may both match the sentiment "Anxious," but the social-networking system 160 may determine that a match with the former sentiment-word may be of a high degree and may determine that a match with the latter sentiment-word may be of a low degree. In this example, the social-networking system 160 may award a relatively high sentiment-score for the former and relatively low sentiment-score for the latter. A single communication may have multiple sentiment-scores. As an example and not by way of limitation, for a post with the text "looking forward to watching Star Wars today" the social-networking system 160 may calculate the following sentiment-cores: {0.6 optimistic; 0.3 excited; 0.1 militaristic}. The presence of different sentiment-words may affect some or all of the sentiment-scores based on the sentiments with which the sentiment-words are associated. As an example and not by way of limitation, for a message with the text "i love to work," the social-networking system 160 may calculate the following sentiment-scores: {0.6 happy; 0.4 tired}. In this example, the sentiment-word "love" may have had a positive effect on the sentiment-score for "Happy" and the sentiment-word "work" may have had a negative effect on the same sentiment-score, resulting in a value of 0.6. The converse may have been true for the sentiment-score for "Tired," resulting in a value of 0.4. The social-networking system 160 may further refine the sentiment-scores by considering the text of a communication holistically (e.g., by considering the usage of certain sentiment-words alongside other sentiment-words). As an example and not by way of limitation, for the message with the text "i love to work," the social-networking system 160 may calculate the following sentiment-scores: {0.6 happy; 0.3 motivated; 0.1 tired}. In this example, the sentiment-score for the sentiment "Motivated" may have resulted from the placement of the word "love" near the word "work," which may indicate that the author of the message is feeling motivated. Alternatively, the social-networking system 160 may calculate a high sentiment-score for the sentiment "Sarcastic" because, based on a history of communications on the social-networking system 160, the social-networking system 160 may conclude that users are often sarcastic when they associate work with the word "love." In particular embodiments, the social-networking system 160 may base its calculation of sentiment-scores on other sentiment indicators. As an example and not by way of limitation, the social-networking system 160 may increase the sentiment-score for the sentiment "Excited" or the sentiment "Frustrated" if it detects the use of an exclamation point. In this example, the level of increase may be affected by the number of exclamation points in the communication (e.g., "can't believe what happened today!!!!"). As another example and not by way of limitation, the use of an ellipsis may cause the increase of the sentiment-score for the sentiment "Confused" (e.g., "can't believe what happened today . . . ."). In particular embodiments, the social-networking system 160 may base its calculation of sentiment-scores on information associated with the particular content item. As an example and not by way of limitation, the information may include metadata that describes the nature of the content. In this example, referencing FIG. 3, metadata for the content item 310 may specify that the content item 130 contains sarcasm (e.g., because the content provider, the television show Last Week Tonight, illustrated in FIG. 3, is a satirical news program). Consequently, the social-networking system 160 may determine that a communication including the word "great" should receive a high sentiment-score for the sentiment "Frustrated"—even though "great" may be a sentiment-word associated with the sentiment "Excited"—because the term "great" may be used sarcastically in the context of a content item that inspires sarcasm. In particular embodiments, the social-networking system 160 may base its calculation of sentiment-scores on information associated with the content-distributor (e.g., a creator of the content item, a publisher of the content item that may have simply published the content item without itself creating the content item) associated with the particular content item. As an example and not by way of limitation, for an article from a satire publication (e.g., *The Onion*), the social-networking system 160 may calculate, for a communication, a higher sentiment-score for the sentiment "Amused."

In particular embodiments, the social-networking system 160 may calculate the sentiment-score of a communication based on a degree to which an embedding of a sentiment-word matches an embedding of an n-gram of the text of the communication. The social-networking system 160 may use one or more features of the deep-learning model described in co-pending U.S. patent application Ser. No. 14/949,436, filed 23 Nov. 2015, which is incorporated by reference. The social-networking system 160 may embed n-grams (including sentiment-words) in a multi-dimensional embedding space (e.g., a d-dimensional embedding space). Each n-gram may be mapped to a respective vector representation using, for example and not by way of limitation, a dictionary generated by the deep-learning model. Each of the vector representations may be a vector $\mathbb{R}^d$, where $\mathbb{R}$ denotes the set of real numbers and d is a hyper-parameter that controls capacity. Each vector representation for an n-gram may correspond to an embedding in the embedding space. As an example and not by way of limitation, coordinates for a point in the embedding space may be determined based on each vector representation. An embedding for a particular sentiment-word may be at a location in the embedding space that is within a threshold distance of embeddings of relevant n-grams (e.g., n-grams that are frequently used with the sentiment-word, n-grams that are pre-determined to be associated with the sentiment-word). A match may be found between an embedding of a sentiment-word and an embedding of an n-gram if it is within the threshold distance. As an example and not by way of limitation, the n-gram "despot" may match the sentiment-word "tyrant" because their respective embeddings may be within a threshold distance. In this example, a post with the text "the king is a tyrant" may have a similar sentiment-score to a post with the text "the king is a despot." The degree of the match may be based on the distance between the respective embeddings. As an example and not by way of limitation, for a post with the text "this is entertaining," the embedding of the n-gram "entertaining" may be within the threshold distance of the embedding of the sentiment-word "funny," but may be more distant than the embedding of the n-gram "amusing." In this example, a post with the text "this is amusing" may receive a higher sentiment-score for the sentiment "Funny" than the post with the text "this is entertaining."

In particular embodiments, the calculation of the one or more sentiment-scores for the each of the plurality of communications may include calculating one or more sentiment-scores based on one or more classifier functions. Each classifier function may calculate one or more sentiment-scores based on a unique set of information from a communication to calculate a respective sentiment-score. As an example and not by way of limitation, the different sets of information may include any combination of the text of the communication, the title associated with the particular content item, the content distributor associated with the particular content item, metadata associated with the content item, the text of one or more replies made in response to the communication, or the nontextual commentary of the communication (e.g., media items such as emojis). In this example, a first classifier function may calculate a sentiment-score for a communication based on the text of the communication; a second classifier function may do so based on the text of the communication and the title associated with the particular content item; a third classifier function may do so based on the text of the communication as well as metadata associated with the particular content item; a fourth classifier function may do so based on the text of one or more replies made in response to the communication; a fifth classifier function may do so based on the nontextual commentary of the communication; a sixth classifier function may do so based on a summary of the article provided by the content publisher (e.g., a website from the article is linked); and a seventh classifier may do so based on the identity of the content publisher as determined by the domain of the link. Each of the classifier functions may be a function of a series of different elements (e.g., n-grams) of the relevant commentary in a communication. As an example and not by way of limitation, a sentiment-score may be calculated using the first classifier function as follows: score=$f_1(n_1, n_2, \ldots, n_N)$, where the n series represents n-grams of the text of the communication (i.e., the relevant commentary for the first classifier function). As another example and not by way of limitation, a sentiment-score may be calculated using the third classifier function as follows: score=$f_3$ ($n_1, n_2, \ldots, n_N, m_1, m_2, \ldots, m_N$), where the n series represents n-grams of the text of the communication and the m series represents n-grams of the metadata associated with the particular content item. For each classifier function, one or more sentiment-scores may be determined based on the set of information unique to that classifier. As an example and not by way of limitation, for a post with the text "oh wow," using the first classifier function, the social-networking system 160 may extract n-grams from the text of the communication and match them with sentiment-words as discussed above. In this example, the first classifier function may return the following sentiment-scores: {0.7 excited; 0.3 appreciative}. As another example and not by way of limitation, for the second classifier function, a communication with the text "wow" that links to an article titled "Hit and Run on Grove Street," may receive a relatively high sentiment-score for the sentiment "Scared," whereas the same text in a communication linking to an article titled "Man Does Double Backflip" may receive a relatively high sentiment-score for the sentiment "Impressed." As another example and not by way of limitation, for the third classifier function, the social-networking system 160 may extract n-grams from the text of the communication and may also extract metadata from the content item that may specify that the content item is satire. In this example, the third classifier function may return the following sentiment-scores for the same post as the previous example: {0.5 amused; 0.3 frustrated; 0.2 excited}. As yet another example and not by way of limitation, for the seventh classifier function, the social-networking system 160 may append "_dom_{name_of_website}" to the communication, and this may be an embedding for the domain. The social-networking system 160 may use this as a means for calculating sentiment-scores, with the seventh classifier function, for the communication based on the associated domain. As an example and not by way of limitation, a communication linking to an article from a comical website may receive a higher sentiment-score for the sentiment "Happy" than a communication linking to an article from a news website.

In particular embodiments, the social-networking system 160 may determine, for each of the plurality of communications, an overall sentiment for the communication. The overall sentiment for a communication may be based on the calculated sentiment-scores for the communication. In particular embodiments, determining the overall sentiment may include summing different sentiment-scores calculated for the communication. Different combinations of different sentiment-scores for different sentiments may result in different overall sentiments based on a suitable algorithm. As an example and not by way of limitation, the algorithm may determine that the sentiment-scores {0.6 angry, 0.4 frustrated} may be summed to result in the overall sentiment "Angry". The overall sentiment need not be one of the sentiments corresponding to the calculated sentiment-scores. As an example and not by way of limitation, the algorithm may determine that the sentiment-scores {0.7 optimistic, 0.3 sad} may be summed to result in the overall sentiment "Motivated." In particular embodiments, the social-networking system 160 may sum the sentiment-scores calculated used some or all of the different classifier functions. In particular embodiments, the summing of the different sentiment-scores may include weighting the different sentiment-scores differently. As an example and not by way of limitation, sentiment-scores calculated using different classifier functions may each be weighted. In this example, at least some of the sentiment-scores calculated using the different classifier functions may be weighted differently (e.g., the first and second classifier functions may have a weight of 2.0, while the third, fourth, and fifth classifier functions may have a weight of 0.9). In particular embodiments, the social-networking system 160 may apply a threshold filter, which may determine that an overall sentiment cannot be resolved for a particular communication. In such a case, the social-networking system 160 may return a null overall sentiment. This may occur when there is a threshold degree of contradicting sentiment-scores for the communication. As an example and not by way of limitation, if the communication receives the sentiment-scores {0.6 happy, 0.4 sad}, the social-networking system 160 may return a null overall sentiment (e.g., if the threshold filter specifies that the maximum sentiment-score for a contradictory sentiment is 0.3). As another example and not by way of limitation, the same may result if a first classifier function returns a sentiment-score of {0.6 happy} and a second classifier function returns a sentiment-score of {0.4 sad} (e.g., if the threshold filter specifies that the maximum sentiment-score for a contradictory sentiment is 0.3). The threshold filter may consider the nature of the different sentiments in determining whether they are truly contradictory. As an example and not by way of limitation, the sentiment "Happy" may not necessarily contradict the sentiment "Optimistic". Although this disclosure describes determining a particular sentiment in a particular manner, this disclosure contemplates determining any suitable sentiment in any suitable manner.

In particular embodiments, the social-networking system 160 may calculate one or more sentiment levels for the particular content item. Each sentiment level may correspond to a sentiment. A sentiment level for a particular sentiment may be calculated based on a total number of communications determined to have the particular sentiment as an overall sentiment. In particular embodiments, the total number of communications may be a global total (e.g., all users of the online social network). Alternatively, the total number of communications may be a total number of communications authored by users having one or more user-attributes corresponding to a particular user-attribute specified by, or shared by, a particular user. As an example and not by way of limitation, the particular user may be a user for whom the sentiments-module is being generated. In this example, the total number of communications may be a number of communications authored by users of the online social network within a particular geographical region, all users within a particular demographic. In the same example, the total number of communications may be a number of communications authored by social connections (e.g., on the online social network) of the particular user. In particular embodiments, the social-networking system 160 may determine a geo-location associated with the client system 130 of the user and limit the total number of communications to include only communications within a geographical region based on the geo-location of the client system 130. As an example and not by way of limitation, the social-networking system 160 may determine that the client system 130 is located in California, and may calculate the total number of communications based on the number of communications originating in the United States, in California, in a fifteen-mile radius, or in any other suitable geographical region. In particular embodiments, the total number of communications may only include certain types of communications. As an example and not by way of limitation, the total number of communications may include posts, reshares, and comments, but not private messages. In particular embodiments, the sentiment level may be calculated based on a number of associated social signals (e.g., likes, reshares, comments) associated with communications determined to have the respective sentiment. As an example and not by way of limitation, a communication with many likes may increase the calculated sentiment level by a larger amount than a similar communication with fewer likes. In particular embodiments, the sentiment level may be calculated based on a degree of certainty that communications are associated with the respective sentiment. As an example and not by way of limitation, a communication with the sentiment-scores {0.9 happy, 0.1 inspired} may increase the calculated sentiment level of the overall sentiment "Happy" by a larger amount than a communication with the sentiment-scores {0.6 happy, 0.4 inspired}. In particular embodiments, the calculated sentiment level may be a function of any combination of the factors described above or any other suitable factor on which the sentiment level may be based. As an example and not by way of limitation, the function for calculating a sentiment level may be represented by the following expression: $f(m_1,m_2,m_3)$, where $m_1$, $m_2$, and $m_3$ are three different factors. The calculated sentiment level may alternatively be a sum of different functions that may be weighted in a suitable manner (e.g., the weights being pre-determined by the social-networking system 160). As an example and not by way of limitation, the function for calculating a sentiment level may be represented by the following expression: A $f_1(m_1,m_2)$+B $f_2(m_3)$, where $m_1$, $m_2$, and $m_3$ are three different factors, and where A and B are two different weights. Although this disclosure describes calculating a particular sentiment level in a particular manner, this disclosure contemplates calculating any similarly suitable value in any suitable manner.

In particular embodiments, the social-networking system 160 may generate a sentiments-module that includes one or more sentiment-representations corresponding to one or more overall sentiments having sentiment levels greater than a threshold sentiment level. Each of the sentiment-representations may visually depict the respective sentiment. As an example and not by way of limitation, referencing FIG. 3, the sentiment-representation 360 may be a visual depiction of the sentiment "Motivated." A threshold sentiment level may be a threshold value, such that sentiments having a sentiment level greater than the threshold value may be included in the sentiments-module. Alternatively, the sentiment level and the threshold sentiment level may be a sentiment rank and a threshold sentiment rank, respectively. As an example and not by way of limitation, referencing FIG. 3, threshold sentiment rank may have been set to three. In this example, the top three sentiments (i.e., the sentiments ranked 1 to 3) may have been "Angry", "Shocked", and "Motivated," and may thus have caused the social-networking system 160 to include sentiment-representations of those three sentiments in the sentiments-module 320. In particular embodiments, the sentiments-module may only be generated for the particular content item if there exist a threshold number of communications (e.g., posts, reshares, comments, or messages associated with the particular content item) on the online social network for which an overall sentiment has been determined. As an example and not by way of limitation, the number of communications meets a threshold number 2,000 but there may be one communication for which an overall sentiment cannot be determined (e.g., if it has contradictory sentiment-scores such as {0.5 happy; 0.5 sad} such that the threshold filter does not permit an overall sentiment to be determined). In this example, the social-networking system 160 may determine that the threshold number of communications has not been met, and may consequently not generate the sentiments-module for the particular content item. In particular embodiments, the sentiments-module may be generated in response to a search query associated with the particular content item. In particular embodiments, the sentiments-module may be created when a search-results interface is to be rendered for the particular content item. Although this disclosure describes generating a particular module in a particular manner, this disclosure contemplates generating any suitable module in any suitable manner.

In particular embodiments, the social-networking system 160 may send the sentiments-module to a client system 130 of a user (e.g., a user of the online social network). As an example and not by way of limitation, the sentiments-module may be sent as a module included in a search-results interface, trending-topics interface, or another suitable search-results interface. The sentiments-module may include, in addition to the one or more sentiment-representations of overall sentiments, one or more numerical or other representations of data related to communications determined to have the represented overall sentiments. As an example and not by way of limitation, referencing FIG. 3, a numerical representation of the total number of communications (e.g., posts) determined to have the "Angry" sentiment (e.g., "6,595") is displayed under the sentiment-representation of that sentiment. As another example and not by way of limitation, a histogram representation of the same information may be displayed under the respective sentiments. Although this disclosure describes sending a particular module in a particular manner, this disclosure contemplates sending any suitable module or interface in any suitable manner.

In particular embodiments, the social-networking system 160 may receive an input from the client system 130 that specifies a particular sentiment. As an example and not by way of limitation, the particular sentiment may be one of the sentiments represented in the sentiments-module (e.g., referencing FIG. 3, the sentiments "Angry", "Shocked", and "Motivated"). A particular sentiment may be specified in any suitable manner. As an example and not by way of limitation, referencing FIG. 3, the sentiment-representations of the three displayed sentiments may be interactive elements (e.g., the sentiment-representation 360), in which case, the user may specify a particular sentiment by selecting the associated sentiment-representation. As another example and not by way of limitation, the user may specify the particular sentiment by selecting it from a dropdown menu. In response to receiving the input, the social-networking system 160 may determine one or more communications associated with the particular sentiment. The determined communications may be limited to communications that are viewable to the user submitting the input, based on privacy settings associated with the communications. As an example and not by way of limitation, an author of a communication may have set privacy settings for the communication specifying that only first-degree connections of the author (e.g., on the online social network) may view the communication. In this example, the communication may only be viewable to the user if the user is a first-degree connection of the author. The social-networking system 160 may send some or all of the determined communications to the client system 130 of the user. The sent communications may be displayed to the user alongside the sentiments-module or within a new window, pop-up notification, or other suitable location.

Figure 9:
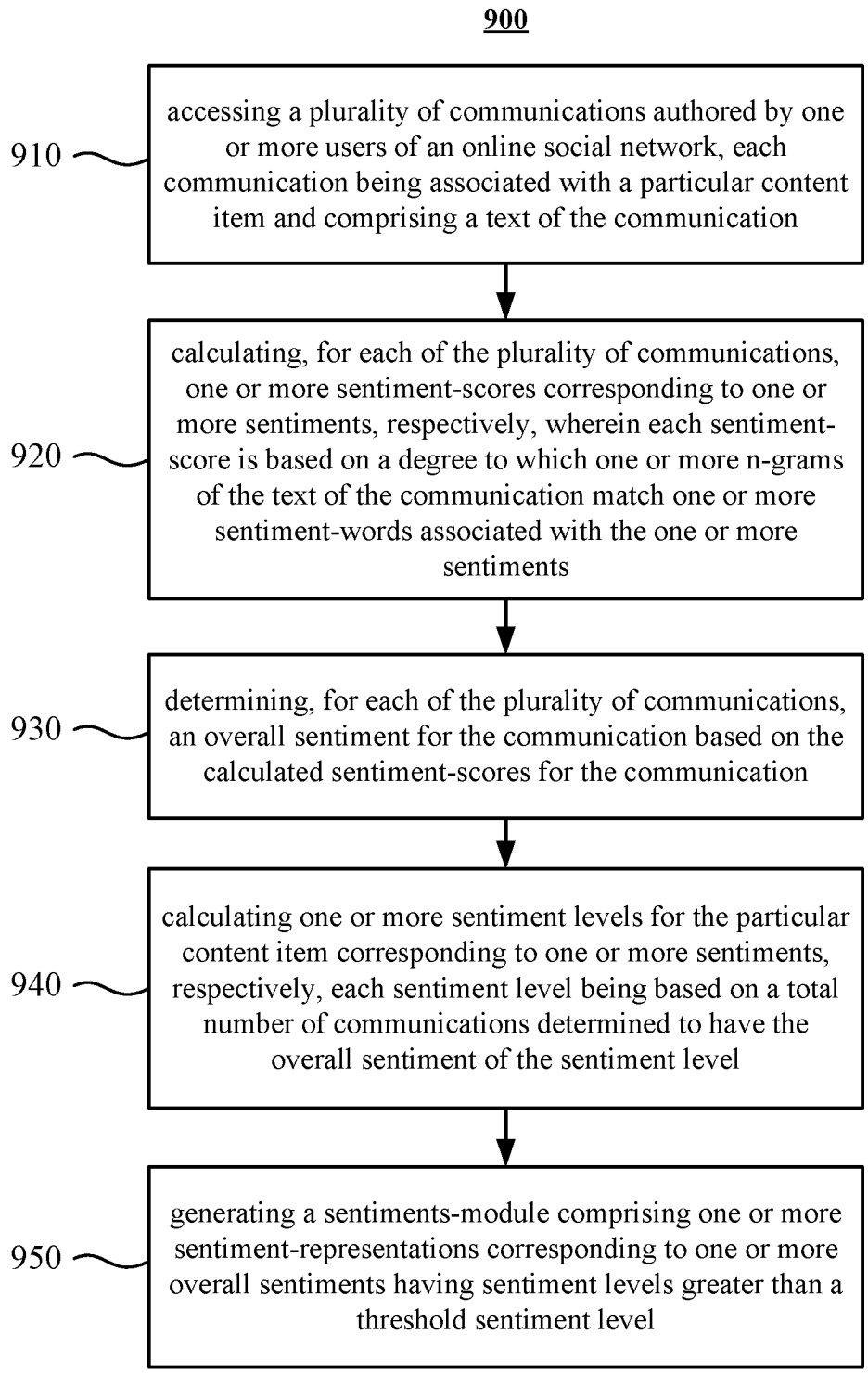
FIG. 9 illustrates an example method for generating a sentiments-module.

FIG. 9 illustrates an example method 900 for generating a sentiments-module. The method may begin at step 910, where the social-networking system 160 may access a plurality of communications authored by one or more users of an online social network, each communication being associated with a particular content item and comprising a text of the communication. At step 920, the social-networking system 160 may calculate, for each of the plurality of communications, one or more sentiment-scores corresponding to one or more sentiments, respectively, wherein each sentiment-score is based on a degree to which one or more n-grams of the text of the communication match one or more sentiment-words associated with the one or more sentiments. At step 930, the social-networking system 160 may determine, for each of the plurality of communications, an overall sentiment for the communication based on the calculated sentiment-scores for the communication. At step 940, the social-networking system 160 may calculate one or more sentiment levels for the particular content item corresponding to one or more sentiments, respectively, each sentiment level being based on a total number of communications determined to have the overall sentiment of the sentiment level. At step 950, the social-networking system 160 may generate a sentiments-module comprising one or more sentiment-representations corresponding to one or more overall sentiments having sentiment levels greater than a threshold sentiment level. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for generating a sentiments-module including the particular steps of the method of FIG. 9, this disclosure contemplates any suitable method for sending data corresponding to media items based on a user input including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Quotations-Modules

In particular embodiments, the social-networking system may generate a quotations-module for a search-results interface. As discussed previously, the social-networking system 160 may access a plurality of communications authored by one or more users of an online social network. Each of the plurality of communications may be associated with a particular content item and may include some form of commentary, which may include a text of the communication. Although this disclosure focuses on textual commentary, it contemplates other forms of commentary, which may include media items (e.g., emojis, stickers, image files, audio files, video files), which the social-networking system 160 may interpret into text. For each of the plurality of communications, the social-networking system 160 may extract one or more quotations from the text of the communication. A quotation may be identified, for example, by quotation-indicators such as quotation marks, or by comparing the text of the communication with text from the particular content item. The social-networking system 160 may determine, for each extracted quotation, one or more partitions of the quotation. As an example and not by way of limitation, a quotation may be partitioned into individual sentences or clauses. The social-networking system 160 may group the extracted quotations into one or more clusters based on a respective degree of similarity among their respective one or more partitions. As an example and not by way of limitation, the social-networking system may calculate a degree of similarity based on a Levenshtein distance between two quotations and may group the two quotations together if they are within a threshold degree of similarity. The social-networking system 160 may calculate a cluster-score for each cluster based on a frequency of occurrence of one or more partitions of one or more quotations in the cluster in communications associated with the particular content item. The social-networking system 160 may generate a quotations-module comprising one or more representative quotations, each representative quotation being a quotation from a cluster having a cluster-score greater than a threshold cluster-score. The quotations-module may allow a user who is interested in the particular content item to quickly view popular quotations from the particular content item. This may help the user understand the particular content item better (e.g., by focusing the user's attention on particularly important or relevant portions of the particular content item) or may help the user understand how others view the particular content item (e.g., by displaying what other users felt were important enough to quote in a communication). Although this disclosure focuses on displaying quotations within a module, it contemplates other applications for the extracted quotations. As an example and not by way of limitation, quotations may be displayed as search results outside of any particular module. As another example and not by way of limitation, adhering to privacy constraints (e.g., a user may opt in or opt out of having quotations or other information associated with the user used in the online social network for any or all purposes), the quotations and information related to the users (e.g., demographic information) who authored the communications may be compiled into a report for interested parties (e.g., a company may study such a report to create quotable content for their future press releases that may be targeted to particular demographics).

In particular embodiments, the social-networking system 160 may access a plurality of communications authored by one or more users of an online social network. Each communication may be associated with a particular content item. The communications may include commentary such as text. As discussed in further detail above, communications may also include media items, and the social-networking system 160 may, in particular embodiments, interpret the media items, translating them into n-grams. Although this disclosure describes accessing particular communications in a particular manner, this disclosure contemplates sending any suitable communications in any suitable manner.

In particular embodiments, the social-networking system 160 may extract, for each of the plurality of communications, one or more quotations from the text of the communication. The extracted one or more quotations may be indexed or otherwise stored in a data store (e.g. the data store 164). Alternatively, the communication containing the extracted one or more quotations may itself may be indexed or stored in a data store (e.g. the data store 164), along with quotation-information specifying where the quotation is within the communication. The social-networking system 160 may retrieve the stored quotations or communications (from which quotations can be reconstructed based on the quotation-information) at any time for generating and displaying the quotations-module, in accordance with the methods described below. A quotation may be defined to include a text string in the communication that is identical or substantially identical to a text string present in the particular content item. The social-networking system 160 may determine that a text string from a communication is a quotation to be that is to be extracted by comparing the text string to text associated with the particular content item and extracting the text string if there is a match. Text associated with the particular content item may be defined to include text within the particular content item (e.g., text from an article). In so doing, the social-networking system 160 may consider text from the particular content item's metadata or other suitable associated information. As an example and not by way of limitation, for a particular content item that is an audio file of a song, the social-networking system 160 may compare text strings in a communication with text strings in associated song-lyric information. The comparison function described above may be performed using an algorithm such as the SimHash algorithm, which is an algorithm that may be used to compare datasets quickly and efficiently. This process may be useful for real-time comparisons, where time and space are particularly limited. The SimHash algorithm may be used to find a similarity between datasets. Instead of comparing two datasets, which may be a difficult or time-consuming task, the SimHash algorithm compares SimHashes of the datasets. A SimHash of a dataset may be characterized as an approximation of the dataset (which may be analogized to a fingerprint of the dataset). For example, in comparing two datasets A and B, SimHashes may be created for both A and B, respectively. In this example, the dataset A may be text associated with the particular content item (e.g., the text of a sentence of an article, the text of a subpart of the article, the text of the entire article) and the dataset B may the text associated with a communication (e.g., the text of a sentence of a post associated with the article, the text of a subpart of the post, the text of the entire post). The SimHash algorithm may then compute the intersection of the two SimHashes (i.e., SimHash(A)∩SimHash (B)) to determine whether A and B are similar. The SimHash algorithm may allow for non-exact matches to be determined similar if they are similar to a threshold degree. For example, if the hamming distance between a text string in dataset A and a text string in dataset B is sufficiently small, a non-exact match may be determined by the social-networking system 160, in which case the social-networking system 160 may extract the corresponding text as a quotation. In particular embodiments, if a post has multiple sentences, this comparison process may be performed iteratively for each sentence.

Alternatively or additionally, the social-networking system 160 may extract as quotations text strings in a communication that have been demarcated as a quotation by the author of the communication using any suitable quotation-indicator. Quotation-indicators may be language devices, such as punctuations that commonly serve to demarcate quotations. As examples and not by way of limitation, quotation-indicators may be include a set of single or double quotation marks, a set of guillemets, a set of brackets, a colon (e.g., a post may include the text "Neil Armstrong: That's one small step for a man, one giant leap for mankind," where the quotation to be extracted is the text following the colon), or any other suitable device. The online social network may have its own quotation-indicators that allow an author user to designate a text string as a quotation. As an example and not by way of limitation, an author user may be able to select a text string within a communication and specify that it is a quotation before posting the communication. In order to be considered a quotation, a text string may need to have a minimum number of n-grams (e.g., three words). Although this disclosure focuses on extracting text, it contemplates extracting other forms of commentary such as media items. As an example and not by way of limitation, an article may contain the following string: "don't cry because it's over; instead, ☺ because it happened." In this example, the emoji "☺" may have meaning within the context of the string (e.g., it may stand for the word "smile"), and a communication may include the emoji when quoting the string from the article. The social-networking system 160 may accordingly extract the entire string, including the emoji, as a quotation. Although this disclosure describes extracting particular elements of particular communications in a particular manner, this disclosure contemplates extracting any suitable element of any suitable communications in any suitable manner.

In particular embodiments, the social-networking system 160 may determine for each extracted quotation, one or more partitions of the quotation. The social-networking system 160 may determine any suitable partitions for a quotation. As an example and not by way of limitation, a quotation that includes more than one sentence may be partitioned into individual sentences or into groups of sentences. As another example, a quotation may be partitioned into individual clauses or groups of clauses. As yet another example, a quotation may be partitioned into individual phrases or groups of phrases. In some cases, the social-networking system 160 may determine that a quotation has only one partition. Although this disclosure describes determining particular partitions in a particular manner, this disclosure contemplates determining any suitable partitions in any suitable manner.

In particular embodiments, the social-networking system 160 may group the extracted quotations into one or more clusters based on a respective degree of similarity among their respective one or more partitions. The social-networking system 160 may group extracted quotations into a cluster if they are within a threshold degree of similarity. The degree of similarity may be determined based on a calculation of a similarity metric that measures the similarity between the quotations. As an example and not by way of limitation, the similarity metric may be based on a suitable edit distance such as a Levenshtein distance between the partitions. For example, for two quotations Q1 and Q2, the social-networking system 160 may calculate a similarity metric value using the following equation:

$$\text{similarity metric} = 1 - \frac{\text{Levenshtein Distance}(Q1, \text{intersection}(Q1, Q2))}{\text{length}(Q1)}.$$

In this example, Q1 and Q2 may be quotations having different string lengths (e.g., Q1 may be shorter than Q2). In this example, the closer the similarity metric is to 1, the more similar Q1 and Q2 are. Two quotations may be determined to be sufficiently similar to be grouped in a cluster if the similarity metric is sufficiently close to 1. There may be a minimum similarity metric value, below which two quotations are deemed not sufficiently similar. In some instances, Q1 and Q2 may be described as having some partitions that overlap and others that do not. As an example and not by way of limitation, Q1 and Q2 may both be quoting a paragraph from an article with sentences 1-7. Q1 may be a quotation consisting of partitions (e.g., in this example, each partition corresponding to a respective sentence of the same number) 2-5; Q2 may be a quotation consisting of partitions 1-7. In this example, the social-networking system 160, may compute for these two quotations, a similarity metric that indicates that Q1 and Q2 are sufficiently similar. The social-networking system 160 may, as a result, group Q1 and Q2 into a single cluster. The degree of similarity between two quotations may also be based on an edit distance between the two quotations. Edit distance is a way of quantifying how similar or dissimilar two strings are to one another by counting the minimum number of operations required to transform one string into the other (e.g., the number of characters that need to be changed and the relative position of the characters). Quotations with a small edit distance may be more similar than quotations with a large edit distance. As an example and not by way of limitation, the quotation "roughly 1.3 billion tonnes of food get wasted every year" may have a small edit distance with the quotation "roughly 1.3 billion tons of food get wasted every year" because only two operations are required to transform "tonnes" into "tons" (a deletion of one "n" and a deletion of the "e" in "tonnes"). The social-networking system 160 may group quotations that are within a maximum edit distance into a single cluster. Although this disclosure describes grouping particular elements of particular communications in a particular manner, this disclosure contemplates grouping any suitable elements of any suitable communications in any suitable manner.

In particular embodiments, the social-networking system 160 may calculate a cluster-score, which may be a quantitative measure of the relevance or popularity of a cluster of quotations, for each cluster based on a frequency of occurrence of one or more quotations in the cluster in communications associated with the particular content item. Referring to the example immediately above, if there are thirty occurrences of Q1 and twenty occurrences of Q2 in communications within a period of time, the social-networking system 160 may determine that there are fifty occurrences of their respective cluster within the period of time. A cluster-score may then be calculated based on this frequency of occurrence. Alternatively, the cluster-score may be based on a frequency of occurrence of one or more partitions of the one or more quotations in the cluster. The social-networking system 160 may similarly calculate cluster-scores for any other clusters. The cluster-scores may be calculated based on quotations that were extracted over a period of time (e.g., over the past three hours), or may alternatively be based on an overall count of quotations. In particular embodiments, the cluster-score may be based on a degree of mutual similarity of quotations in the cluster. As an example and not by way of limitation, a cluster with highly similar quotations that occur 30 times may receive a higher cluster-score than a cluster with less similar quotations that occur 30 times, all else equal. In particular embodiments, the cluster-score for a particular cluster may be based on a number of social signals associated with quotations in the cluster. As an example and not by way of limitation, a cluster with quotations from communications having many likes may receive a higher cluster-score than otherwise. In particular embodiments, the cluster-score may be based on demographic information associated with a user for whom the quotations-module is generated. As an example and not by way of limitation, clusters containing quotations from communications by authors of the same age group or nationality as the user may receive a higher cluster-score than otherwise. As another example and not by way of limitation, clusters of quotations including explicit language may receive a lower cluster-score than otherwise if the user is under a certain age. In particular embodiments, the cluster-score may be based on a language associated with a user for whom the quotations-module is generated. As an example and not by way of limitation, if the user has indicated only a knowledge of English (e.g., through profile information, device settings, historical usage of the online social network), a quotation from a Hindi-language portion of the particular content item may receive a lower quotation-score than a quotation from an English-language portion of the particular content item. In particular embodiments, the cluster-score may be based on user preferences associated with a user (as determined, for example, by a usage history of the user or by preferences explicitly specified by the user) for whom the quotations-module is generated. As an example and not by way of limitation, for a user who has a history of reading articles with relatively simple language, clusters quoting relatively simple language may receive a higher cluster-score than clusters quoting relatively dense or difficult language. In particular embodiments, the cluster-score may be based on a current geo-location of the client system 130 of a user for whom the quotations-module is generated. As an example and not by way of limitation, clusters containing quotations from communications originating from within a region near the geo-location of the client system 130 of the user may receive a higher cluster-score than otherwise. In particular embodiments, the quotation-score for a particular quotation may be based on an affinity coefficient between a user for whom the quotations-module is generated and authors of the communications from which quotations in the cluster were extracted. As an example and not by way of limitation, clusters of quotations extracted from posts authored by members of a left-leaning political party may receive a higher quotation-score than otherwise if the user is also a member of the same political party. In particular embodiments, the calculated cluster-score may be a function of any combination of the factors described above or any other suitable factor on which the cluster-score may be based. As an example and not by way of limitation, the function for calculating a cluster-score may be represented by the following expression: $f(m_1,m_2,m_3)$, where $m_1$, $m_2$, and $m_3$ are three different factors. The calculated cluster-score may alternatively be a sum of different functions that may be weighted in a suitable manner (e.g., the weights being pre-determined by the social-networking system 160). As an example and not by way of limitation, the function for calculating a cluster-score may be represented by the following expression: $A\, f_1(m_1,m_2)+B\, f_2(m_3)$, where $m_1$, $m_2$, and $m_3$ are three different factors, and where A and B are two different weights. Although this disclosure describes calculating particular scores for particular quotations in a particular manner, this disclosure contemplates calculating any suitable scores for any suitable quotations in any suitable manner.

In particular embodiments, the social-networking system 160 may generate a quotations-module comprising one or more representative quotations. In particular embodiments, the quotations-module may be generated for a particular content item when there have been a threshold number of communications for which quotations are determined. In particular embodiments, the quotations-module may be generated in response to a search query associated with the particular content item. In particular embodiments, the quotations-module may be created when a search-results interface is to be rendered for the particular content item. Each of the representative quotations may be a quotation from a cluster having a cluster-score greater than a threshold cluster-score. The social-networking system 160 may select a representative quotation by calculating a quotation-score for each quotation. The social-networking system 160 may select quotations having a quotation-score greater than a threshold quotation-score as representative quotations to send to the quotations-module. In particular embodiments, the quotation-score for a particular quotation may be based on the number of communications in which the particular quotation was included. As an example and not by way of limitation, in calculating the quotation-score, the social-networking system 160 may count the number of communications including the exact quotation. As another example and not by way of limitation, the social-networking system 160 may use an algorithm that also accounts for quotations that are non-exact matches. For example, the social-networking system 160 may base the quotation-score on the value resulting from the following expression: $q+\Sigma_{i=0}^{n}$ ($\alpha \times$similarity metric), where q is a count of the exact quotation and a is a respective count of non-exact quotations (from i=0 to i=n). In this example, counts of non-exact matches (e.g., quotations missing a word or phrase) also impact the quotation-score, with their impact being weighted by their similarity. As an example, a quotation that is very similar (e.g., a quotation with a single misspelled word) may have a similarity metric approaching 1, in which case its count may be weighted in full, whereas a quotation that is very different (e.g., a quotation missing a sentence) may have a similarity metric of 0.5, in which case its count may be weighted in half. In particular embodiments, the social-networking system 160 may update the quotations-module in real-time. The social-networking system 160 may ensure efficient usage of space and resources by limiting the number of quotations stored at a given time, performing the steps above and pushing the resulting representative quotations periodically, or at a point when there exists a need for an update. In particular embodiments, the quotation-score for a particular quotation may be based on the string length of the particular quotation. As an example and not by way of limitation, there may be an optimal string length for quotations displayed in the quotations-module. In this example, quotations that have a string length close to the optimal string length may receive a higher quotation-score than otherwise. In particular embodiments, the quotation-score for a particular quotation may be based on a number of social signals associated with the particular quotation. As an example and not by way of limitation, a quotation consisting of partitions 2-5 may have been included in ten communications that each have two likes. In this example, the particular quotation may be deemed to have twenty likes in total, and may result in the social-networking system 160 calculating a higher quotation-score for the particular quotation that it would have had if the particular quotation only had fifteen likes. In particular embodiments, the quotation-score for a particular quotation may be based on a quality of the particular quotation. As an example and not by way of limitation, the particular quotation may receive a lower quotation-score if it has spelling errors, has nonconventional capitalization, is written in all capitals, or has other undesirable qualities. In particular embodiments, the quotation-score for a particular quotation may be based on a the presence of certain words in the particular quotation. As an example and not by way of limitation, the social-networking system 160 may consider information associated with a user for whom the quotations-module is generated to calculate higher quotation-scores for quotations that censor inappropriate words. For example, in the case of a five-year-old user, the quotation-score for "turn that ** thing off" may receive a higher quotation-score than "turn that damn thing off." In particular embodiments, the quotation-score for a particular quotation may be based on information associated with one or more users who authored the communications including the particular quotation. As an example and not by way of limitation, the information may include demographic information. In this example, the social-networking system 160 may compare the demographic information of the author users with the demographic information of a user for whom the quotations-module is generated. For example, for a quotations-module generated for a user who is thirty years old, the particular quotation may have a higher quotation-score if it were commonly quoted in communications authored by users in their thirties than by users in their sixties. As another example and not by way of limitation, the information may include location information. For example, for a quotations-module generated for a user who is in the United States, the particular quotation may have a higher quotation-score if it were commonly quoted in communications authored by users in the United States (as determine by, for example, geo-location information associated with the author users' client systems) than by users in Canada. In particular embodiments, the calculated quotation-score may be a function of any combination of the factors described above or any other suitable factor on which the quotation-score may be based. As an example and not by way of limitation, the function for calculating a quotation-score may be represented by the following expression: $f(m_1, m_2, m_3)$, where $m_1$, $m_2$, and $m_3$ are three different factors. The calculated quotation-score may alternatively be a sum of different functions that may be weighted in a suitable manner (e.g., the weights being pre-determined by the social-networking system 160**). As an example and not by way of limitation, the function for calculating a quotation-score may be represented by the following expression: $A f_1(m_1, m_2) + B f_2(m_3)$, where $m_1$, $m_2$, and $m_3$ are three different factors, and where A and B are two different weights. Although this disclosure describes generating a particular module that includes particular elements of particular communications, this disclosure contemplates generating, in any suitable manner, any suitable module or interface that includes any suitable elements of any suitable communications.

In particular embodiments, the social-networking system 160 may send, for display, the quotations-module to a client system 130 of a user (e.g., a user of the online social network). As an example and not by way of limitation, referencing FIG. 3, the quotations-module 330 may be sent as a module included in a search-results interface. The mentions-module may also be sent as a module included in any other suitable search-results interface, such as a trending-topics interface. The quotations-module may include, in addition to the representative quotations, one or more numerical or other representations of data related to communications from which the representative quotations were extracted or communications from which quotations of the same cluster were extracted. As an example and not by way of limitation, a numerical representation of the total number of communications that included a representative quotation may be displayed alongside the representative quotation (e.g., referencing the quotations-module 330 in FIG. 3, the text "28 people quoted this" displayed under the respective quotation). As another example and not by way of limitation, a histogram representation of the same information may be displayed in a similar fashion. Although this disclosure describes sending a particular module in a particular manner, this disclosure contemplates sending any suitable module or interface in any suitable manner.

Figure 10:
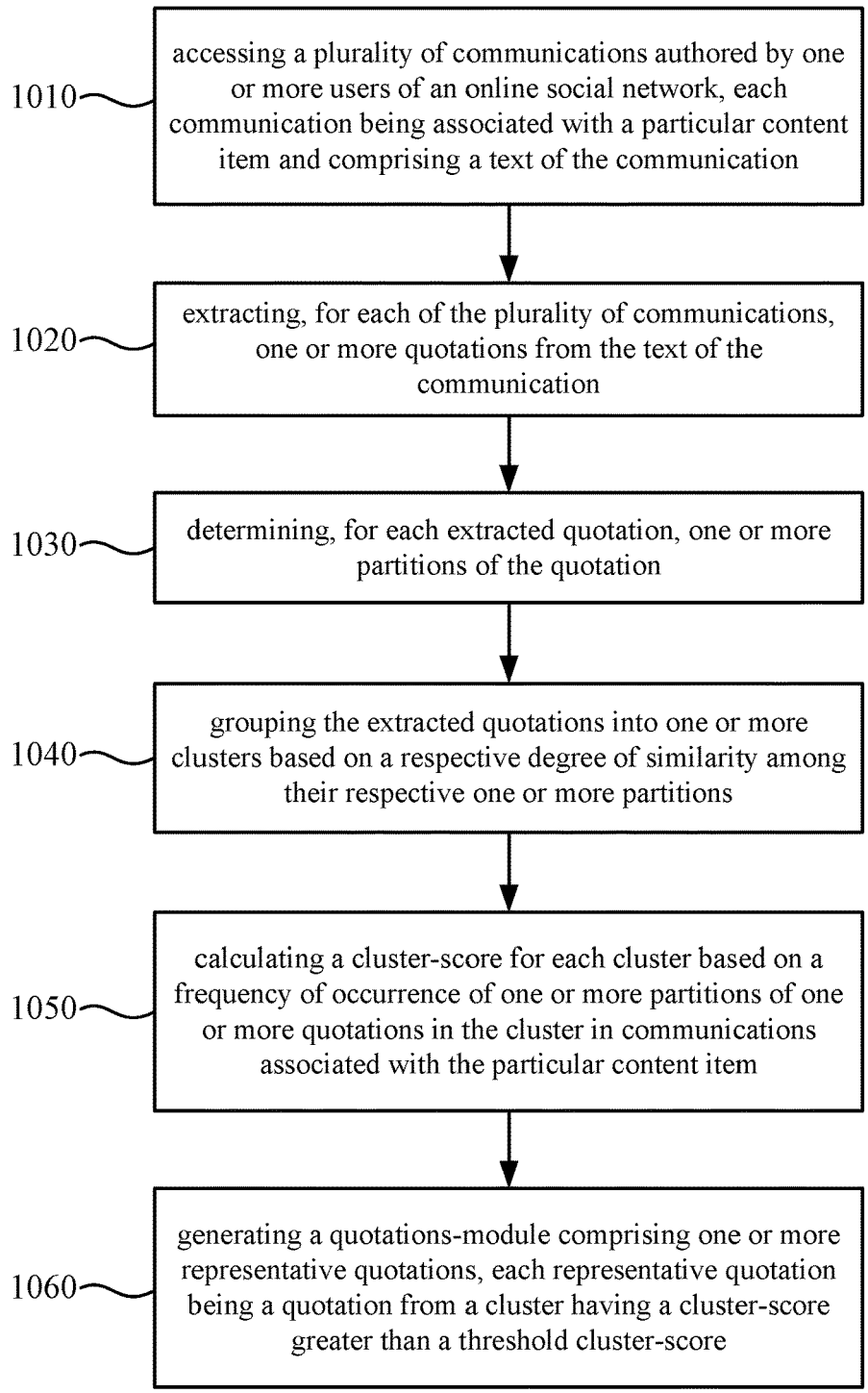
FIG. 10 illustrates an example method for generating a quotations-module.

FIG. 10 illustrates an example method 1000 for generating a quotations-module. The method may begin at step 1010, where the social-networking system 160 may access a plurality of communications authored by one or more users of an online social network, each communication being associated with a particular content item and comprising a text of the communication. At step 1020, the social-networking system 160 may extract, for each of the plurality of communications, one or more quotations from the text of the communication. At step 1030, the social-networking system 160 may determine, for each extracted quotation, one or more partitions of the quotation. At step 1040, the social-networking system 160 may group the extracted quotations into one or more clusters based on a respective degree of similarity among their respective one or more partitions. At step 1050, the social-networking system 160 may calculate a cluster-score for each cluster based on a frequency of occurrence of one or more partitions of one or more quotations in the cluster in communications associated with the particular content item. At step 1060, the social-networking system 160 may generate a quotations-module comprising one or more representative quotations, each representative quotation being a quotation from a cluster having a cluster-score greater than a threshold cluster-score. Particular embodiments may repeat one or more steps of the method of FIG. 10, where appropriate. Although this disclosure describes and illustrates particular steps of the method of FIG. 10 as occurring in a particular order, this disclosure contemplates any suitable steps of the method of FIG. 10 occurring in any suitable order. Moreover, although this disclosure describes and illustrates an example method for generating a quotations-module including the particular steps of the method of FIG. 10, this disclosure contemplates any suitable method for sending data corresponding to media items based on a user input including any suitable steps, which may include all, some, or none of the steps of the method of FIG. 10, where appropriate. Furthermore, although this disclosure describes and illustrates particular components, devices, or systems carrying out particular steps of the method of FIG. 10, this disclosure contemplates any suitable combination of any suitable components, devices, or systems carrying out any suitable steps of the method of FIG. 10.

Mentions-Modules

In particular embodiments, the social-networking system may generate a mentions-module for a search-results interface. As discussed previously, the social-networking system 160 may access a plurality of communications authored by one or more users of an online social network. Each of the communications may be associated with a particular content item. The social-networking system 160 may extract, for each of the plurality of communications, one or more n-grams from the text of the communication. Although this disclosure focuses on textual commentary, it contemplates other forms of commentary, which may include media items (e.g., emojis, stickers, image files, audio files, video files), which the social-networking system 160 may interpret into text. The social-networking system 160 may identify one or more mention-terms from the one or more extracted n-grams. Each mention-term may be defined to include a noun-phrase. The social-networking system 160 may confirm that the noun-phrase is not a quotation from the particular content item (e.g., by comparing it against the text of quotations in the quotations-module or against the text of the particular content item itself). The social-networking system 160 may calculate a term-score for each mention-term. The term-score may be based on a frequency of occurrence of the mention-term in the plurality of communications. As an example and not by way of limitation, a mention-term that was included in fifty of the plurality of communications associated with the particular content item may receive a greater term-score than a mention-term that was included in forty of the same set of communications. The social-networking system 160 may generate a mentions-module including one or more mentions. Each of the mentions in the mentions-module may include a mention-term having a term-score greater than a threshold term-score. Each of the mentions may also have text from one or more communications that include the mention-term. As an example and not by way of limitation, a mention may include at least a portion of the text of a communication that includes the mention-term, including text that immediately precedes or follows the mention-term. The mention-term may be in bold, highlighted, or otherwise distinguished from the rest of the included text. In the aggregate, people react to content items in similar ways such that particular n-grams may emerge as commonly used in communications relating to the content items. These commonly used n-grams can be used to summarize the content items, and when the n-grams are provided in context with users' communications, can be used to showcase user reactions in a useful manner. For example, viewing the mentions-module may allow a user who is interested in a particular content item to better understand the particular content item (e.g., by displaying words that others may have used to describe the content item) or to understand how others view the particular content item (e.g., by displaying words that may have been used by others to describe their reaction to the particular content item). Although this disclosure focuses on displaying mentions and mention-terms within a module, it contemplates other applications for the determined mentions and mention-terms. As an example and not by way of limitation, mentions may be displayed as search results outside of any particular module (e.g., a user may search "barack obama" and get a list of mention-terms such as "state of the union" and "signs ObamaCare"). As another example and not by way of limitation, adhering to privacy constraints, the mentions or mention-terms and information related to the users (e.g., demographic information) who authored the communications may be compiled into a report for interested parties (e.g., a polling company may use it as polling data to understand how particular demographics view a political candidate or to understand what campaign slogans resonate with potential voters).

In particular embodiments, the social-networking system 160 may access a plurality of communications authored by one or more users of an online social network. Each of the communications may be associated with a particular content item. As discussed in further detail above, communications may also include media items, and the social-networking system 160 may, in particular embodiments, interpret the media items, translating them into n-grams. Although this disclosure describes accessing particular communications in a particular manner, this disclosure contemplates sending any suitable communications in any suitable manner.

In particular embodiments, the social-networking system 160 may extract, for each of the plurality of communications, one or more n-grams from the text of the communication. Although this disclosure focuses on extracting n-grams, it contemplates extracting other forms of commentary such as media items. As an example and not by way of limitation, a communication may contain the following text:

"don't cry because it's over; instead, ☺ because it happened." In this example, the emoji "☺" may have meaning within the context of the text (e.g., it may stand for the word "smile"), and the social-networking system 160 may extract the string "☺ because it happened."

In particular embodiments, the social-networking system 160 may identify one or more mention-terms from the one or more extracted n-grams. A mention-term may be defined to include a noun-phrase, or one or more other suitable n-grams. As an example and not by way of limitation, referencing FIG. 3, as may be seen within the mentions-module 340, the social-networking system 160 may have identified, among others, the noun-phrases "much food" and "grocery stores." In identifying mention-terms, the social-networking system 160 may parse through the n-grams in the plurality of communications. The social-networking system 160 may perform a part-of-speech analysis on the n-grams, and may use a noun-phrase extractor algorithm to identify noun-phrases that may be potential mention-terms. Alternatively or additionally, the social-networking system 160 may determine that one or more n-grams are commonly used within the plurality of communications and may correspondingly determine that they are mention-terms (irrespective of whether they are noun-phrases). Alternatively or additionally, the social-networking system 160 may compare n-grams with a pre-determined set of words to determine whether any n-gram is particularly relevant to the particular content item. The pre-determined set of words may be populated using information extracted from the particular content item. As an example and not by way of limitation, a pre-determined set of words for an article about food waste may include frequently used words that were extracted from the article, such as "waste" or "1.3 billion tonnes" (which may have been an estimate of how much food is wasted, as reported in the article). More information on identifying n-grams such as the mention-terms described herein may be found in U.S. patent application Ser. No. 14/797,819, filed 13 Jul. 2015.

In particular embodiments, the social-networking system 160 may filter out potential mention-terms (e.g., noun-phrases) based on a relevance of the potential mention-terms with respect to the particular content item. A potential mention-term may be of higher relevance if it is unique to the particular content item as compared with other content items. The social-networking system 160 may use a TF-IDF filter (using the same TF-IDF principles described in detail above) to filter out potential mention-terms that are not unique enough to be mention-terms for the particular content item. At least conceptually, the plurality of communications associated with the particular content item may be analogized to a document (the social-networking system 160 may even treat the plurality of communications as a document by storing within such a construct). Potential mention-terms that occur frequently in all communications generally, but do not appear frequently enough in the plurality of communications associated with the particular content item, may be filtered out for being not particularly unique or relevant to the particular content item. As an example and not by way of limitation, a potential mention-term "my" may be filtered out. The social-networking system 160 may further refine this process by analyzing related collections of content items. As an example and not by way of limitation, the social-networking system 160 may analyze communications associated with other content items within a corpus of communications defined by a shared topic. In this example, for a plurality of communications associated with a content item about Donald Trump's hair, the social-networking system 160 may perform a TF-IDF analysis using the corpus of all communications that are associated with the topic "Donald Trump." Having performed this analysis, the social-networking system 160 may determine that the potential mention-term "donald" appears frequently in the entire corpus such that it is not particularly unique or relevant to the content item about Donald Trump's hair. By contrast, social-networking system 160 may determine that the potential mention-term "great hair" is sufficiently unique to be identified as a mention-term. More information on filtering, including some additional methods, may be found in U.S. patent application Ser. No. 14/938,685, filed 11 Nov. 2015, which is incorporated by reference.

In particular embodiments, the social-networking system 160 may calculate a term-score for each mention-term. The term-score may be based on a frequency of occurrence of the mention-term in the plurality of communications. As an example and not by way of limitation, a mention-term that occurs fifty times may receive a higher term-score than if it had only occurred forty times. Term-scores may be calculated based on mention-terms that were present in communications over a period of time (e.g., over the past three hours), or may alternatively be based on an overall count of mention-terms. In particular embodiments, the term-score may be based on social signals associated with communications including the mention-term. As an example and not by way of limitation, a mention-term identified in communications having many likes may receive a higher term-score than otherwise. In particular embodiments, the term-score may be based on demographic information associated with one or more authors of one or more communications including the mention-term. As an example and not by way of limitation, the term-score may be higher if the communications in which the mention-term was included were authored by users of a particular demographic (e.g., users who were of the same age as a user for whom the mentions-module is generated). As another example and not by way of limitation, mention-terms that include British slang may receive a higher term-score for a user from the United Kingdom (e.g., a user whose profile information indicates London as a hometown) than for a user from the United States. As yet another example and not by way of limitation, mention-terms including explicit language may receive a lower term-score than otherwise if the user is under a certain age. In particular embodiments, the term-score may be based on location information associated with the client system 130 of a user for whom the mentions-module is generated. As an example and not by way of limitation, the term-score may be higher if the communications in which the mention-term was included originated from the same region as the user for whom the mentions-module is generated, as may be determined by geo-location information sent from the client system 130 of the user. In particular embodiments, the term-score may be based on a language associated with a user for whom the mentions-module is generated. As an example and not by way of limitation, if the user has indicated only a knowledge of Spanish (e.g., through profile information, device settings, historical usage of the online social network), a Russian mention-term may receive a lower term-score than an otherwise equivalent Spanish mention-term. In particular embodiments, the term-score for a particular mention-term may be based on an affinity coefficient between a user for whom the mentions-module is generated and authors of the communications from which the mention-term was identified. As an example and not by way of limitation, mention-terms extracted from posts authored by members of a right-leaning political party may receive a higher term-score than otherwise if the user is also a member of the same political party. In particular embodiments, the term-score for a particular mention-term is further based on whether the mention-term is included in one or more other search-results modules generated for the particular content item. This may only occur if the one or more other search-results modules is, or will be, concurrently displayed with the mentions-module. As an example and not by way of limitation, the social-networking system 160 may compare the text of quotations in a quotations-module with the text of communications surrounding the mention-term to see if there is a sufficient degree of matching between the two texts. This may be advantageous for several reasons. For example, it may favor original user reactions over mere quotations. It may also serve to provide more information to the user by acting as a de-duplication tool (e.g., if a quotation already relates to a particular mention-term, it may be less likely that the mention-term will provide new information to the user). Alternatively or additionally, the social-networking system 160 may achieve the same result without having to resort to comparing mention-terms against other search-results modules. As an example and not by way of limitation, rather than comparing mention-terms against the text of quotations in the quotations-module, the social-networking system 160 may use the SimHash algorithm method described above to independently compare a text string associated with the particular content item with a particular text string of the communication. In this example, if the text strings are sufficiently similar (i.e., if they are likely to be quotations), mention-terms identified from the particular text string of the communication may receive a relatively low term-score (or alternatively, such mention-terms may be dropped as potential mention-terms entirely). In particular embodiments, the calculated term-score may be a function of any combination of the factors described above or any other suitable factor on which the term-score may be based. As an example and not by way of limitation, the function for calculating a term-score may be represented by the following expression: $f(m_1,m_2,m_3)$, where $m_1$, $m_2$, and $m_3$ are three different factors. The calculated term-score may alternatively be a sum of different functions that may be weighted in a suitable manner (e.g., the weights being pre-determined by the social-networking system 160). As an example and not by way of limitation, the function for calculating a term-score may be represented by the following expression: $A f_1(m_1,m_2)+B f_2(m_3)$, where $m_1$, $m_2$, and $m_3$ are three different factors, and where A and B are two different weights. Although this disclosure describes calculating particular scores for particular terms in a particular manner, this disclosure contemplates calculating any suitable scores for any suitable terms in any suitable manner.

In particular embodiments, the social-networking system 160 may generate a mentions-module including one or more mentions. In particular embodiments, the mentions-module may be generated for a particular content item when there have been a threshold number of communications associated with the particular content item or when there have been a threshold number of such communications for which mentions are determined. In particular embodiments, the mentions-module may be generated in response to a search query associated with the particular content item. In particular embodiments, the mentions-module may be created when a search-results interface is to be rendered for the particular content item. Each of the mentions in the mentions-module may include a mention-term having a term-score greater than a threshold term-score. The term-score and the threshold term-score may be a term-rank and a threshold term-rank, respectively. As an example and not by way of limitation, the mentions-module may contain only the top five mentions or mentions including the top five mention-terms. Each of the mentions may also have text from one or more communications that include the mention-term. In particular embodiments, the text from the one or more communications in each mention is extracted from one or more representative communications from the plurality of communications. The text may include one or more n-grams preceding or following the one or more mention-terms within the representative communication. As an example and not by way of limitation, referencing FIG. 3, the mentions-module 340 includes text from a representative communication that precedes (e.g., "I can't even begin to tell how") and follows (e.g., "gets thrown away at places I've worked") the mention-term "much food." The mention-term may be in bold (as is the case in the search-results module 340 of FIG. 3), highlighted, or otherwise distinguished from the rest of the included text. In determining the representative communications for a particular mention-term, the social-networking system 160 may calculate a representative-communication-score for communications that include a respective mention-term. A communication that has a representative-communication-score greater than a threshold representative-communication-score may be determined to be a representative communication. In particular embodiments, the representative-communication-score may be based on an affinity coefficient between a user for whom the mentions-module is generated and an author of the representative communication. As an example and not by way of limitation, a communication by an author who is a member of the same group as the user (which may correspondingly increase the affinity coefficient between the user and the author) may receive a higher representative-communication-score than a similar communication by another user. As another example and not by way of limitation, a communication by an author whose posts the user frequently likes (which may correspondingly increase the affinity coefficient between the user and the author) may receive a higher representative-communication-score than a similar communication by another user. In particular embodiments, the representative-communication-score may be based on an degree of separation on the social graph of the online social network between a user for whom the mentions-module is generated and an author of the representative communication. As an example and not by way of limitation, a communication by a first-degree connection of a user may receive a higher representative-communication-score than a similar communication by a user who is not such a connection. In particular embodiments, the representative-communication-score may be based on social signals associated with the communication. As an example and not by way of limitation, a communication with many likes may receive a higher representative-communication-score than otherwise. In particular embodiments, the representative-communication-score may be based on demographic information associated with one or more authors of the respective communication. As an example and not by way of limitation, the representative-communication-score may be higher if the communication was authored by a user of a particular demographic (e.g., a user of the same age as a user for whom the mentions-module is generated). As another example and not by way of limitation, communications that include Australian slang may receive a higher representative-communication-score for a user from the Australia (e.g., a user whose profile information indicates Sydney as a hometown) than for a user from the United States. As yet another example and not by way of limitation, communications including explicit language may receive a lower representative-communication-score than otherwise if the user is under a certain age. In particular embodiments, the representative-communication-score may be based on location information associated with the client system 130 of a user for whom the mentions-module is generated. As an example and not by way of limitation, the representative-communication-score may be higher if the respective communication originated from the same region as the user for whom the mentions-module is generated, as may be determined by geo-location information sent from the client system 130 of the user. In particular embodiments, the representative-communication-score may be based on a language associated with a user for whom the mentions-module is generated. As an example and not by way of limitation, if the user has indicated only a knowledge of Arabic (e.g., through profile information, device settings, historical usage of the online social network), a Swahili communication may receive a lower representative-communication-score than an otherwise equivalent Arabic communication. In particular embodiments, the representative-communication-score may be based on a user preference associated with a user for whom the mentions-module is generated. As an example and not by way of limitation, for a user who has a history of reading articles with relatively simple language, communications with relatively simple language may receive a higher representative-communication-score than communications quoting relatively dense or difficult language. In particular embodiments, the representative-communication-score may be based on a quality of the respective communication. As an example and not by way of limitation, the particular quotation may receive a lower representative-communication-score if it has spelling errors, has nonconventional capitalization, is written in all capitals, or has other undesirable qualities. In particular embodiments, the calculated representative-communication-score may be a function of any combination of the factors described above or any other suitable factor on which the representative-communication-score may be based. As an example and not by way of limitation, the function for calculating a representative-communication-score may be represented by the following expression: $f(m_1,m_2,m_3)$, where $m_1$, $m_2$, and $m_3$ are three different factors. The calculated representative-communication-score may alternatively be a sum of different functions that may be weighted in a suitable manner (e.g., the weights being pre-determined by the social-networking system 160). As an example and not by way of limitation, the function for calculating a representative-communication-score may be represented by the following expression: A $f_1(m_1,m_2)$+B $f_2(m_3)$, where $m_1$, $m_2$, and $m_3$ are three different factors, and where A and B are two different weights. Although this disclosure describes generating a particular module that includes particular elements of particular communications, this disclosure contemplates generating, in any suitable manner, any suitable module or interface that includes any suitable elements of any suitable communications.

In particular embodiments, the social-networking system 160 may generate the mentions-module in real-time by running the TF-IDF algorithm in real-time to calculate term-scores in real-time. This real-time implementation may be a leaner version of the method described above, and may result in a quicker and more space-efficient selection of the mentions that are to be included in the mentions-module. In the non-real-time method described above, it was assumed that a large number of mention-terms could be stored without issue, allowing the social-networking system 160 to calculate term-scores for mention-terms identified over possibly long periods of time. In the real-time implementation, there may be space-constraints that limit the number of mention-terms that may be stored at a given time, such that there may be a maximum-storage-number of mention-terms. As an example and not by way of limitation, if the maximum-storage-number is set to thirty, only thirty mention-terms may be stored at a given time for a particular content item. In this example, after identifying a new mention-term that appeared in a single communication, if there are less than thirty mention-terms, the new mention-term may be stored with a respective counter set to 1 and a respective decay counter sent to 1. If the social-networking system 160 subsequently identifies another occurrence of the mention-term in a second communication, the respective counter for the mention-term may be increased by 1, resulting in a count of 2. Following a specified period of time (e.g., 30 seconds), the decay counters of all stored mention-terms may be increased by 1. The social-networking system 160 may compute the decay of all stored mention-terms. As an example and not by way of limitation, the social-networking system 160 may use the following equation to calculate the decay-value for each mention-term: decay=tf–idf score×occurrence×$r^d$, where tf–idf score is a score based on the output of the TF-IDF algorithm, occurrence is the current counter value, r is the decay rate, d is the current decay-counter value. In this example, the social-networking system 160 may remove mention-terms that have a decay-value below a threshold decay-value. The social-networking system 160 may calculate a term-score for each stored mention-term based on the following equation: term-score=tf–idf score×occurrence. The term-score calculated in the real-time implementation may also be based on any of the factors described above or any suitable combination thereof and may be used in the same manner described above in determining which mentions are to be included in the mentions-module.

In particular embodiments, the social-networking system 160 may send, for display, the mentions-module to a client system 130 of a user (e.g., a user of the online social network). As an example and not by way of limitation, referencing FIG. 3, the mentions-module 340 may be sent as a module included in a search-results interface. The mentions-module may also be sent as a module included in any other suitable search-results interface, such as a trending-topics interface. The mentions-module may include, in addition to the mention-terms, one or more numerical or other representations of data related to communications that included the mention-term. As an example and not by way of limitation, a numerical representation of the total number of communications that included a mention-term may be displayed alongside the mention-term (e.g., referencing the quotations-module 340 in FIG. 3, the text "95 people mentioned this" displayed under the respective mention). As another example and not by way of limitation, a histogram representation of the same information may be displayed in a similar fashion. In particular embodiments, the mentions-module may also include information about a user who authored a mention that is displayed in the mentions-module. As an example and not by way of limitation, referencing FIG. 3, the mentions-module 340 may include, near each displayed mention, a profile picture of the author of the representative communication from which the mention comes from. As another example and not by way of limitation, the mentions-module 340 may include, near each displayed mention, a user name of the author of the representative communication from which the mention comes from. Although this disclosure describes sending a particular module in a particular manner, this disclosure contemplates sending any suitable module or interface in any suitable manner.

In particular embodiments, the mention-terms or the mentions may be purged from the social-networking system 160 (e.g., deleted or otherwise removed from computing or storage devices associated with the social-networking system) after a pre-defined period of time. In particular embodiments, a mention-term may be purged only if the total number of times it has occurred in communications associated with the particular content item is less than a minimum value. As an example and not by way of limitation, if the minimum value is ninety and if a mention-term has occurred only a total of fifty times, it may be purged after a pre-defined period of time (e.g., ninety days). Alternatively or additionally, a mention or mention-term may be purged only if the frequency of occurrence of the respective mention-term over a period of time is less than a minimum value within the plurality of communications associated with the particular content item. As an example and not by way of limitation, if the minimum value is twenty and if a mention-term has not occurred in twenty communications (or twenty times in communications) over the past ten days, it may be purged. This purge may result in an increase in privacy, a reduction in storage and computation resource requirements, or any other benefits.

Figure 11:
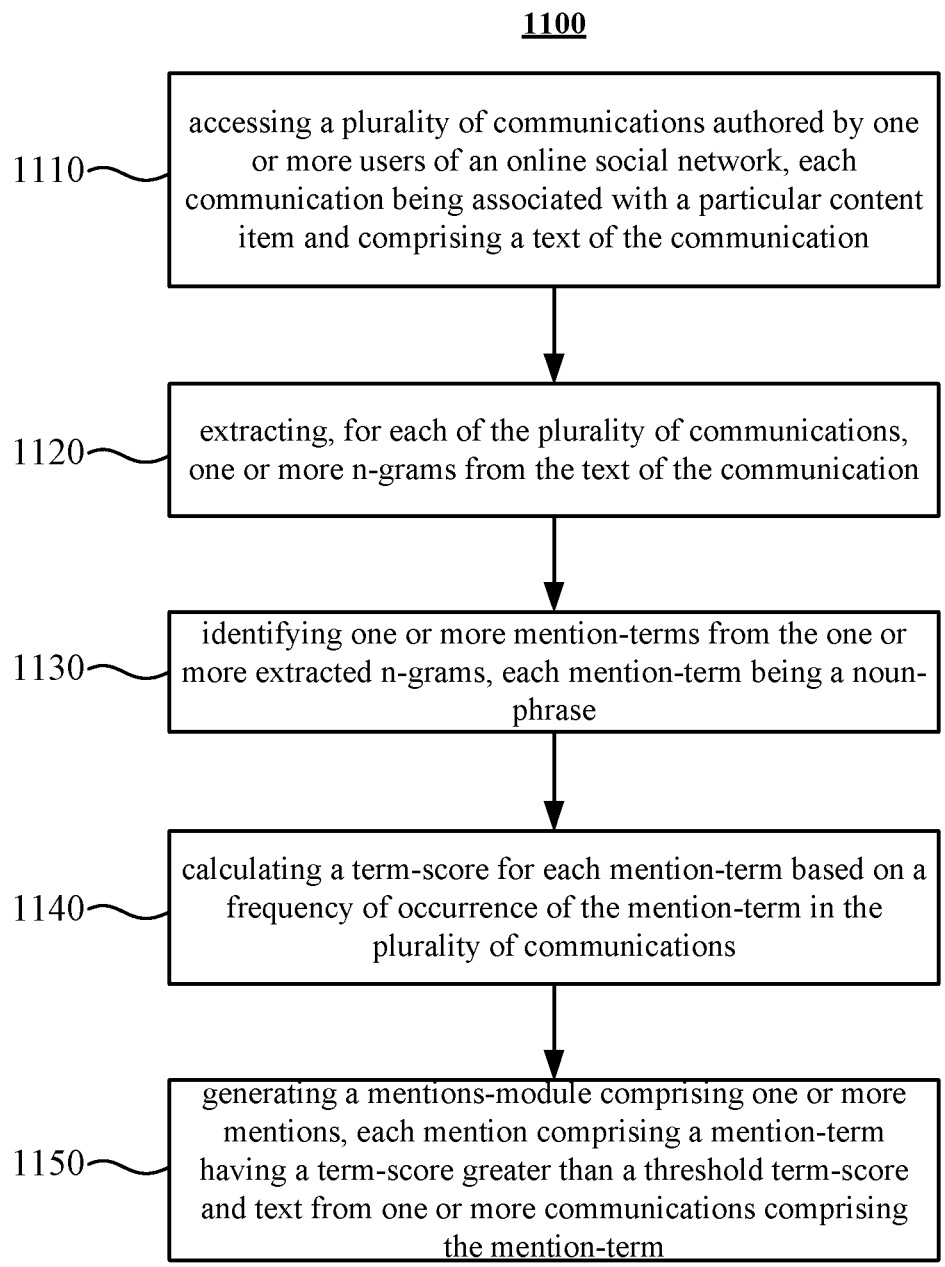
FIG. 11 illustrates an example method for generating a mentions-module.

FIG. 11 illustrates an example method 1100 for generating a mentions-module. The method may begin at step 1110, where the social-networking system 160 may access a plurality of communications authored by one or more users of an online social network, each communication being associated with a particular content item and comprising a text of the communication. At step 1120, the social-networking system 160 may extract, for each of the plurality of communications, one or more n-grams from the text of the communication. At step 1130, the social-networking system 160 may identify one or more mention-terms from the one or more extracted n-grams, each mention-term being a noun-phrase. At step 1140, the social-networking system 160 may calculate a term-score for each mention-term based on a frequency of occurrence of the mention-term in the plurality of communications. At step 1150, the social-networking system 160 may generate a mentions-module comprising one or more mentions, each mention comprising a mention-term having a term-score greater than a threshold term-score and text from one or more communications comprising the mention-term. Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for generating a mentions-module including the particular steps of the method of FIG. 11, this disclosure contemplates any suitable method for sending data corresponding to media items based on a user input including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user may make frequently posts content related to "coffee" or variants thereof, the social-networking system 160 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information.

Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, a third-party system 170, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photos albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 204 corresponding to a particular photo may have a privacy setting specifying that the photo may be accessed only by users tagged in the photo and the tagged user's friends. In particular embodiments, privacy settings may allow users to opt in to or opt out of having their content, information, or actions stored/logged by the social-networking system 160 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 200. A privacy setting may be specified for one or more edges 206 or edge-types of social graph 200, or with respect to one or more nodes 202, 204 or node-types of social graph 200. The privacy settings applied to a particular edge 206 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 204 connected to a user node 202 of the first user by an edge 206. The first user may specify privacy settings that apply to a particular edge 206 connecting to the concept node 204 of the object, or may specify privacy settings that apply to all edges 206 connecting to the concept node 204. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

Privacy settings associated with an object may specify any suitable granularity of permitted access or denial of access. As an example and not by way of limitation, access or denial of access may be specified for particular users (e.g., only me, my roommates, my boss), users within a particular degrees-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. In particular embodiments, access or denial of access may be specified by time or date. As an example and not by way of limitation, a user may specify that a particular image uploaded by the user is visible to the user's friends for the next week. As another example and not by way of limitation, a company may post content related to a product release ahead of the official launch, and specify that the content may not be visible to other users until after the product launch. In particular embodiments, access or denial of access may be specified by geographic location. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from be sent to the user. In the search-query context, an object may be provided as a search result only if the querying user is authorized to access the object, e.g., the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on an online social network, or other computing system As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users that attend the same university as the first user may view the first user's pictures, but that other users that are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system 160 may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system 160 may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, privacy settings may allow a user to specify whether particular applications or processes may access, store, or use particular objects or information associated with the user. The privacy settings may allow users to opt in or opt out of having objects or information accessed, stored, or used by specific applications or processes. The social-networking system 160 may access such information in order to provide a particular function or service to the user, without the social-networking system 160 having access to that information for any other purposes. Before accessing, storing, or using such objects or information, the social-networking system 160 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160. As another example and not by way of limitation, social-networking system 160 may have functionalities that may use as inputs personal or biometric information of the user. A user may opt to make use of these functionalities to enhance their experience on the online social network. As an example and not by way of limitation, a user may provide personal or biometric information to the social-networking system 160. The user's privacy settings may specify that such information may be used only for particular processes, such as authentication, and further specify that such information may not be shared with any third-party system 170 or used for other processes or applications associated with the social-networking system 160. As yet another example and not by way of limitation, an online social network may provide functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to send voice messages, to improve voice recognition in order to use voice-operated features of the online social network), and further specify that such voice recording may not be shared with any third-party system 170 or used by other processes or applications associated with the social-networking system 160.

In particular embodiments, privacy settings may allow a user to specify whether mood or sentiment information associated with the user may be determined, and whether particular applications or processes may access, store, or use such information. The privacy settings may allow users to opt in or opt out of having mood or sentiment information accessed, stored, or used by specific applications or processes. The social-networking system 160 may predict or determine a mood or sentiment associated with a user based on, for example, inputs provided by the user and interactions with particular objects, such as pages or content viewed by the user, posts or other content uploaded by the user, and interactions with other content of the online social network. In particular embodiments, social-networking system 160 may use a user's previous activities and calculated moods or sentiments to determine a present mood or sentiment. A user who wishes to enable this functionality may indicate in their privacy settings that they opt in to social-networking system 160 receiving the inputs necessary to determine the mood or sentiment. As an example and not by way of limitation, social-networking system 160 may determine that a default privacy setting is to not receive any information necessary for determining mood or sentiment until there is an express indication from a user that social-networking system 160 may do so. In particular embodiments, social-networking system 160 may use the predicted mood or sentiment to provide recommendations or advertisements to the user. In particular embodiments, if a user desires to make use of this function for specific purposes or applications, additional privacy settings may be specified by the user to opt in to using the mood or sentiment information for the specific purposes or applications. As an example and not by way of limitation, social-networking system 160 may use the user's mood or sentiment to provide newsfeed items, pages, friends, or advertisements to a user. The user may specify in their privacy settings that social-networking system 160 may determine the user's mood or sentiment. The user may then be asked to provide additional privacy settings to indicate the purposes for which the user's mood or sentiment may be used. The user may indicate that social-networking system 160 may use his or her mood or sentiment to provide newsfeed content and recommend pages, but not for recommending friends or advertisements. Social-networking system 160 may then only provide newsfeed content or pages based on user mood or sentiment, and may not use that information for any other purpose, even if not expressly prohibited by the privacy settings.

In particular embodiments, the social-networking system 160 may temporarily access, store, or use particular objects or information associated with a user in order to facilitate particular actions of the first user, and may subsequently delete the objects or information. As an example and not by way of limitation, a first user may transmit a message to a second user, and the social-networking system 160 may temporarily store the message in a data store 164 until the second user has view or downloaded the message, at which point the social-networking system 160 may delete the message from the data store 164. As another example and not by way of limitation, continuing with the prior example, the message may be stored for a specified period of time (e.g., 2 weeks), after which point the social-networking system 160 may delete the message from the data store 164. In particular embodiments, a user may specify whether particular types of objects or information associated with the user may be accessed, stored, or used by the social-networking system 160. As an example and not by way of limitation, a user may specify that images sent by the user through the social-networking system 160 may not be stored by the social-networking system 160. As another example and not by way of limitation, a first user may specify that messages sent from the first user to a particular second user may not be stored by the social-networking system 160. As yet another example and not by way of limitation, a user may specify that all objects sent via a particular application may be saved by the social-networking system 160.

In particular embodiments, privacy settings may allow a user to specify whether particular objects or information associated with the user may be accessed from particular client systems 130 or third-party systems 170. The privacy settings may allow users to opt in or opt out of having objects or information accessed from a particular device (e.g., the phone book on a user's smart phone), from a particular application (e.g., a messaging app), or from a particular system (e.g., an email server). The social-networking system 160 may provide default privacy settings with respect to each device, system, or application, and/or the user may be prompted to specify a particular privacy setting for each context. As an example and not by way of limitation, a user may utilize a location-services feature of the social-networking system 160 to provide recommendations for restaurants or other places in proximity to the user. The user's default privacy settings may specify that the social-networking system 160 may use location information provided from a client device 130 of the user to provide the location-based services, but that the social-networking system 160 may not store the location information of the user or provide it to any third-party system 170. The user may then update the privacy settings to allow location information to be used by a third-party image-sharing application in order to geo-tag photos.

In particular embodiments, the social-networking system 160 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system 160 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing particular privacy setting, a prompt may be presented to the user to remind the user of his or her current privacy settings and asking the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system 160 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system 160 may prompt the user with a reminder of that the user's current privacy settings of being visible only to friends, and a warning that this change will make all of the users past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system 160 may send a reminder to the user to confirm his or her privacy settings every six months or after every ten photo posts. In particular embodiments, privacy settings may also allow users to control access to the objects or information on a per-request basis. As an example and not by way of limitation, the social-networking system 160 may notify the user whenever a third-party system 170 attempts to access information associated with the user, and require the user to provide verification that access should be allowed before proceeding.

Systems and Methods

Figure 12:
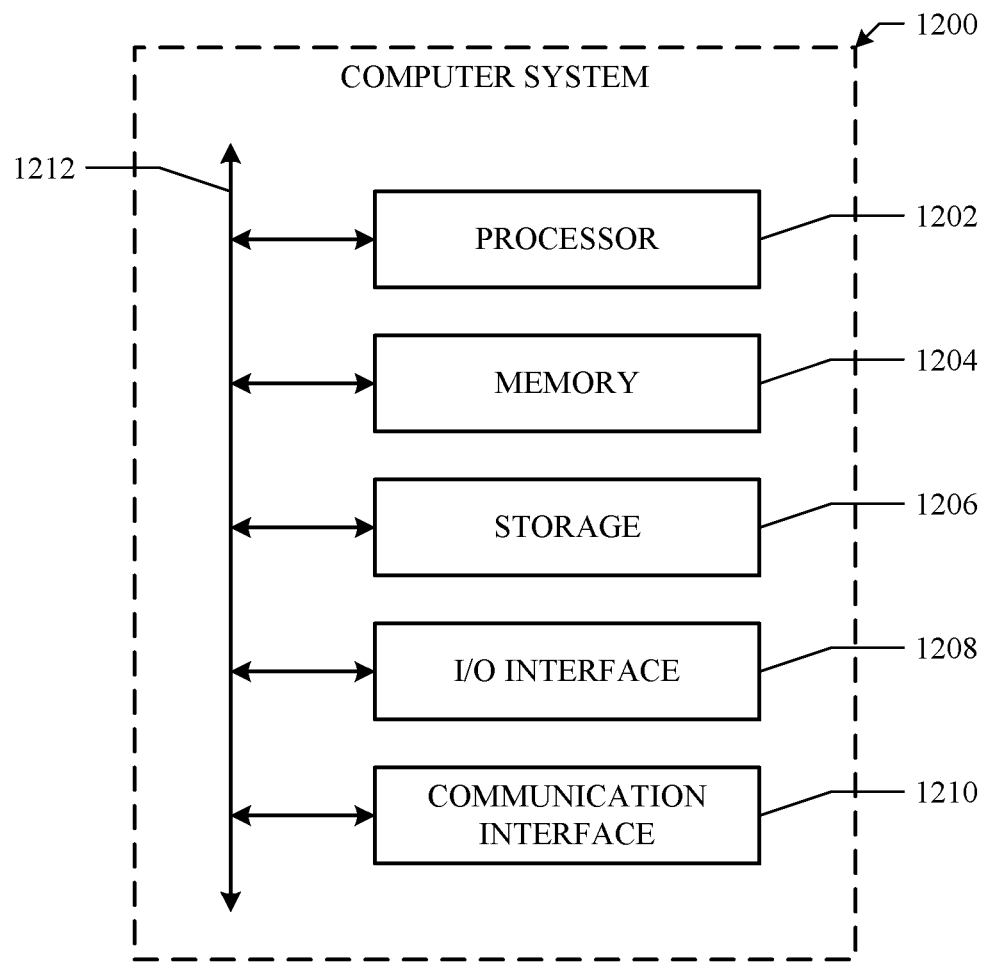
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtual-address translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multi-core processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magneto-optical disc, magnetic tape, or a Universal Serial Bus (USB) drive or a combination of two or more of these. Storage 1206 may include removable or non-removable (or fixed) media, where appropriate. Storage 1206 may be internal or external to computer system 1200, where appropriate. In particular embodiments, storage 1206 is non-volatile, solid-state memory. In particular embodiments, storage 1206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packet-based communication) between computer system 1200 and one or more other computer systems 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such as, for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices:
    accessing, by the one or more computing devices, a plurality of communications authored by one or more users of an online social network, each communication being associated with a particular content item and comprising a text of the communication;
    extracting, for each of the plurality of communications, one or more n-grams from the text of the communication;
    identifying, by the one or more computing devices, one or more mention-terms from the one or more extracted n-grams, each mention-term being a noun-phrase;
    calculating, by the one or more computing devices, a term-score for each mention-term based on a frequency of occurrence of the mention-term in the plurality of communications; and
    generating, by the one or more computing devices, a mentions-module for a first user comprising one or more mentions, each mention comprising a mention-term having a term-score greater than a threshold term-score and text from one or more communications comprising the mention-term, wherein the mention-term is extracted from one or more representative communications from the plurality of communications, the representative communications being selected based on an affinity coefficient between the first user and an author of the representative communication.

2. The method of claim 1, further comprising:
    accessing a social graph comprising a plurality of nodes and a plurality of edges connecting the nodes, each of the edges between two of the nodes representing a single degree of separation between them, the nodes comprising:

a first node corresponding to the first user, the first user being associated with the online social network; and
a plurality of second nodes corresponding to a plurality of communications of the online social network.

3. The method of claim 1, wherein the each communication is associated with the particular content item if the each communication includes a link to an instance of the particular content item.

4. The method of claim 1, wherein the identification of the one or more mention-terms from the one or more extracted n-grams comprises: determining one or more noun phrases from the extracted one or more n-grams based on a part-of-speech analysis; and filtering out one or more of the noun-phrases based on a level of relevance of the noun-phrases with respect to the particular content item as determined by a term frequency-inverse document frequency (TF-IDF) algorithm.

5. The method of claim 4, wherein the determination of the level of relevance by the TF-IDF algorithm is based on a frequency of usage of the one or more n-grams in communications associated with other content items related to a topic shared in common with the particular content item.

6. The method of claim 1, wherein the term-score of a mention-term is further based on one or more social signals associated with one or more of the communications comprising the mention-term.

7. The method of claim 1, wherein the term-score of a mention-term is further based on demographic information associated with one or more authors of one or more of the communications comprising the mention-term.

8. The method of claim 1, wherein the term-score of a mention-term is further based on whether the mention-term is included in one or more other search-results modules generated for the particular content item.

9. The method of claim 1, further comprising sending, to the client system of the first user, the mentions-module for display to the first user, wherein the first user is a user of the online social network.

10. The method of claim 1, wherein the term-score of a mention-term is further based on a location associated with the client system of the first user.

11. The method of claim 9, wherein each of the one or more representative communications has a representative-communication-score greater than a threshold representative-communication-score, the representative-communication-score for the representative communication being based on the affinity coefficient between the first user and the author of the representative communication.

12. The method of claim 1, wherein the text extracted from a representative communication comprises one or more n-grams preceding or following the one or more mention-terms within the representative communication.

13. The method of claim 11, wherein the representative-communication-score is further based on demographic information associated with the first user.

14. The method of claim 11 wherein the representative-communication-score is further based on a language associated with the first user.

15. The method of claim 11, wherein the representative-communication-score is further based on a user preference associated with the first user.

16. The method of claim 11, wherein the representative-communication-score is further based on a respective text quality of the representative communication.

17. The method of claim 1, wherein the mentions-module is generated for the particular content item if there are a threshold number of communications associated with the particular content item.

18. The method of claim 1, wherein the one or more mentions are purged from the one or more computing devices after a pre-defined period of time if its respective frequency of occurrence of the mention-terms included in the mentions is less than a minimum value within the plurality of communications.

19. One or more computer-readable non-transitory storage media embodying software that is operable when executed to:
access a plurality of communications authored by one or more users of an online social network, each communication being associated with a particular content item and comprising a text of the communication;
extract, for each of the plurality of communications, one or more n-grams from the text of the communication;
identify one or more mention-terms from the one or more extracted n-grams, each mention-term being a noun-phrase;
calculate a term-score for each mention-term based on a frequency of occurrence of the mention-term in the plurality of communications; and
generate a mentions-module for a first user comprising one or more mentions, each mention comprising a mention-term having a term-score greater than a threshold term-score and text from one or more communications comprising the mention-term, wherein the mention-term is extracted from one or more representative communications from the plurality of communications, the representative communications being selected based on an affinity coefficient between the first user and an author of the representative communication.

20. A system comprising: one or more processors; and a non-transitory memory coupled to the processors comprising instructions executable by the processors, the processors operable when executing the instructions to:
access a plurality of communications authored by one or more users of an online social network, each communication being associated with a particular content item and comprising a text of the communication;
extract, for each of the plurality of communications, one or more n-grams from the text of the communication;
identify one or more mention-terms from the one or more extracted n-grams, each mention-term being a noun-phrase;
calculate a term-score for each mention-term based on a frequency of occurrence of the mention-term in the plurality of communications; and
generate a mentions-module for a first user comprising one or more mentions, each mention comprising a mention-term having a term-score greater than a threshold term-score and text from one or more communications comprising the mention-term, wherein the mention-term is extracted from one or more representative communications from the plurality of communications, the representative communications being selected based on an affinity coefficient between the first user and an author of the representative communication.

* * * * *